United States Patent
Shim et al.

(10) Patent No.: US 10,920,927 B2
(45) Date of Patent: Feb. 16, 2021

(54) GIMBAL DEVICE

(71) Applicant: Samsung Electronics Co., Ltd, Suwon-si (KR)

(72) Inventors: Jaekyu Shim, Suwon-si (KR); Baeseok Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 300 days.

(21) Appl. No.: 15/916,074

(22) Filed: Mar. 8, 2018

(65) Prior Publication Data

US 2018/0259123 A1   Sep. 13, 2018

(30) Foreign Application Priority Data

Mar. 10, 2017   (KR) .................. 10-2017-0030822

(51) Int. Cl.
| | |
|---|---|
| *F16M 13/04* | (2006.01) |
| *G03B 17/56* | (2006.01) |
| *G01P 3/00* | (2006.01) |
| *F16M 11/10* | (2006.01) |
| *F16M 11/18* | (2006.01) |
| *F16M 11/20* | (2006.01) |
| *H04M 1/12* | (2006.01) |

(Continued)

(52) U.S. Cl.
CPC .......... *F16M 13/04* (2013.01); *F16M 11/041* (2013.01); *F16M 11/10* (2013.01); *F16M 11/123* (2013.01); *F16M 11/18* (2013.01); *F16M 11/205* (2013.01); *F16M 13/00* (2013.01); *G03B 17/561* (2013.01); *G03B 17/563* (2013.01); *H04M 1/12* (2013.01); *F16M 2200/00* (2013.01); *G01P 3/00* (2013.01); *G01P 15/18* (2013.01); *H04M 1/04* (2013.01)

(58) Field of Classification Search
CPC .. F16M 11/123; F16M 11/205; G03B 17/563; G03B 17/561; H04M 1/12; G01P 3/00
See application file for complete search history.

(56) References Cited

U.S. PATENT DOCUMENTS

| | | | |
|---|---|---|---|
| 9,030,149 B1 | 5/2015 | Chen et al. | |
| 2016/0033077 A1* | 2/2016 | Chen ...................... | F16M 11/18 294/139 |

(Continued)

FOREIGN PATENT DOCUMENTS

| | | | |
|---|---|---|---|
| JP | 08056295 A | * | 2/1996 |
| KR | 10-2016-0097175 A | | 8/2016 |

*Primary Examiner* — Bickey Dhakal

(57) ABSTRACT

A gimbal device according to various embodiments of the present disclosure may include: a handle; a gimbal; a joint pivotably coupling one end of the gimbal to the handle; and at least one processor, wherein the gimbal includes: a holder configured to hold an electronic device including a camera; an angular velocity sensor disposed in the holder and configured to detect a movement of the holder; and a plurality of motors coupled to the holder and configured to pivot the holder in pitch, roll, and yaw directions according to the detected movement. The at least one processor is configured to identify a pivoting state of the joint, and to change axis information assigned to each of detection values of three axes obtained by using the angular velocity sensor, based on the identified pivoting state. Other embodiments are possible.

12 Claims, 20 Drawing Sheets

(51) Int. Cl.
*F16M 11/12* (2006.01)
*F16M 13/00* (2006.01)
*F16M 11/04* (2006.01)
G01P 15/18 (2013.01)
H04M 1/04 (2006.01)

(56) References Cited

U.S. PATENT DOCUMENTS

2016/0290556 A1* 10/2016 Choi ...................... F16M 11/18
2016/0334638 A1* 11/2016 Wagner ................ G03B 17/561

* cited by examiner

GIMBAL DEVICE

CROSS-REFERENCE TO RELATED APPLICATION(S)

This application is based on and claims priority under 35 U.S.C. § 119 to Korean Patent Application No. 10-2017-0030822 filed on Mar. 10, 2017, in the Korean Intellectual Property Office, the disclosure of which is incorporated herein by reference in its entirety.

TECHNICAL FIELD

The present disclosure relates to a gimbal device.

BACKGROUND

In recent years, portable electronic devices with an image capturing function, such as smart phones, action cams, etc., are widely used. Image capturing devices included in such portable electronic devices, for example, camera modules, are developing to have small sizes and to have high performance, as the portable electronic devices become smaller. However, users may experience that, as camera modules become smaller, pixel sizes of an image sensor are reduced and sharpness of a captured image is abruptly reduced even in response to a slight movement. In addition, in the age of Memedia in which individuals create various contents, there is an increasing demand for making a video, and a slight movement of a camera module caused by a user's motion when a video is recorded may be a big problem.

Therefore, a gimbal device may be used as a holding means for assisting an image capturing device in capturing a high quality image by automatically compensating for a slight movement of the image capturing device or a user's motion by using a pivoting means such as a motor.

The above information is presented as background information only to assist with an understanding of the present disclosure. No determination has been made, and no assertion is made, as to whether any of the above might be applicable as prior art with regard to the present disclosure.

SUMMARY

Since the gimbal device should balance the center of gravity in an initially designed state to operate, a user should mount a portable electronic device according to a predetermined criterion when initially mounting the portable electronic device. However, a normal gimbal device is configured to hold a portable electronic device only in a horizontal direction. A separate vertical holder may be required to allow the gimbal device to hold the portable electronic device in a vertical direction. Accordingly, the gimbal device may further require additional resources when being developed. Therefore, various embodiments of the present disclosure provide a gimbal device which provides a mode in which a portable electronic device is able to a capture an image both in a horizontal direction and a vertical direction.

A gimbal device according to various embodiments of the present disclosure may include: a handle; a gimbal; and a joint pivotably coupling one end of the gimbal to the handle, wherein the gimbal includes: a holder configured to hold an electronic device including a camera; an angular velocity sensor disposed in the holder and configured to detect a movement of the holder; and a plurality of motors coupled to the holder and configured to pivot the holder in pitch, roll, and yaw directions according to the detected movement. The gimbal device may further include at least one processor, and the at least one processor may be configured to identify a pivoting state of the joint, and to change axis information assigned to each of detection values of three axes obtained by using the angular velocity sensor, based on the identified pivoting state.

A gimbal device according to various embodiments of the present disclosure may include: a handle; a gimbal; and a joint pivotably coupling one end of the gimbal and the handle, wherein the joint includes a lock structure for fixing to maintain an inclined angle between the gimbal and the handle at a predetermined angle. Other embodiments are possible.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
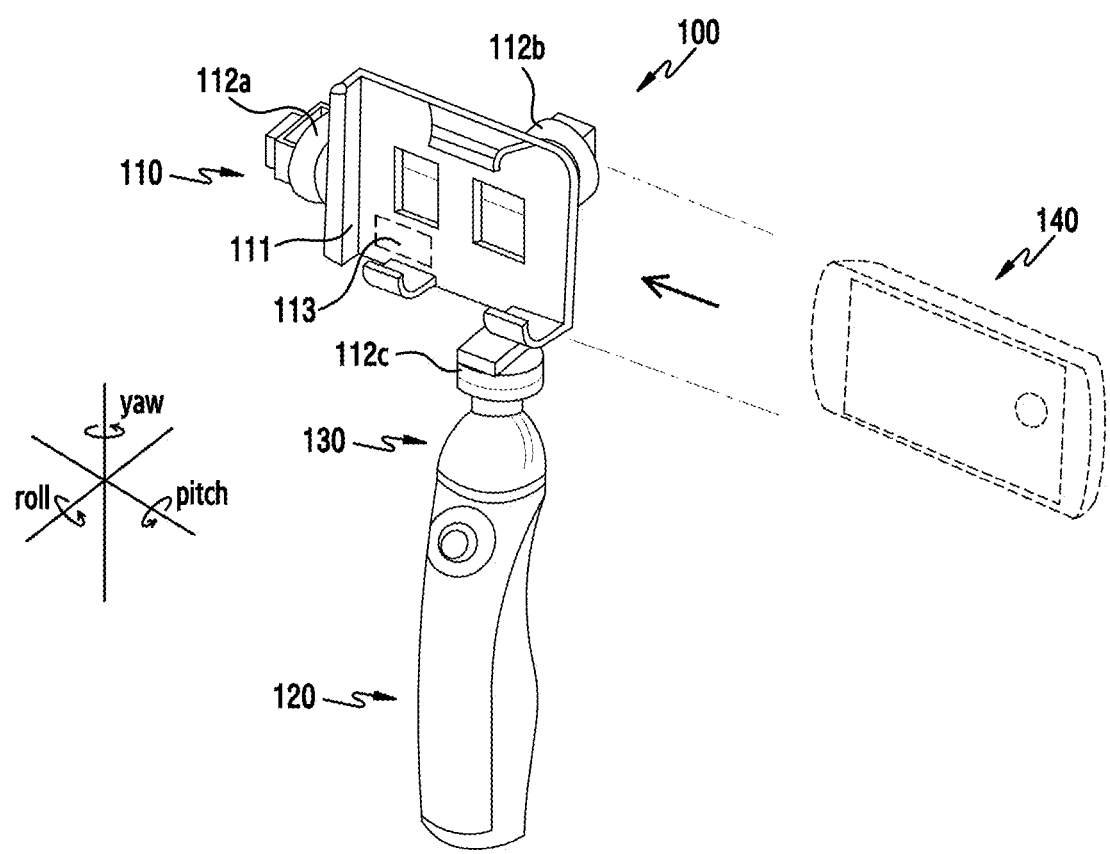
FIG. 1 is a view showing an example of using a gimbal device according to various embodiments of the present disclosure.

FIGS. 1 through 12D, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Various embodiments of the present disclosure will be described herein below with reference to the accompanying drawings. However, exemplary embodiments and terms used herein are not intended to limit the technical features described in the present disclosure to specific embodiments, and should be construed as including modification, equivalent and/or alternative of exemplary embodiments of the present disclosure. In the explanation of the drawings, similar reference numerals are used for similar elements.

The terms "have," "may have," "include," and "may include" used in the present disclosure indicate the presence of corresponding features (for example, elements such as numerical values, functions, operations, or components), and do not preclude the presence of additional features.

The terms "A or B," "at least one of A or/and B," or "one or more of A or/and B" used in the present disclosure include any and all combinations of the associated listed items. For example, the term "A or B," "at least one of A and B," or "at least one of A or B" may refer to all of the case (1) where at least one A is included, the case (2) where at least one B is included, or the case (3) where both of at least one A and at least one B are included.

The terms such as "first," "second," and the like used in various embodiments may be used to refer to various elements regardless of the order and/or importance of the elements, but do not limit the elements. Furthermore, such terms may be used to distinguish one element from another element. For example, "a first user device" and "a second user device" indicate different user devices regardless of the order or importance thereof. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it can be directly coupled with/to or connected to another element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element) therebetween.

According to the situation, the expression "configured to" used herein may be used as, for example, the expression "suitable for," "having the capacity to," "designed to," "adapted to," "made to," or "capable of". The term "configured to" must not mean only "specifically designed to" in hardware. Instead, the expression "a device configured to" may mean that the device is "capable of" operating together with another device or other components. For example, a "processor configured to perform A, B, and C" may mean a dedicated processor (e.g., an embedded processor) for performing a corresponding operation or a generic-purpose processor (e.g., a central processing unit (CPU) or an application processor) which may perform corresponding operations by executing one or more software programs which are stored in a memory device.

Terms used in the present disclosure are used to describe specific embodiments of the present disclosure and are not intended to limit the scope of other embodiments. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal way, unless expressly so defined herein in various embodiments of the present disclosure. In some cases, even if terms are terms which are defined in the specification, they may not be interpreted to exclude embodiments of the present disclosure.

An electronic device according to various embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, wearable devices (for example, smart glasses, head-mounted-devices (HMDs)), electronic apparels, electronic bracelets, electronic necklaces, appcessory, electronic tattoos, smart mirrors, or smart watches.

In embodiments, the electronic devices may be smart home appliances. The smart home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ and PlayStation™), electronic dictionaries, electronic keys, camcorders, or electronic picture frames.

According to another embodiment, the electronic devices may include at least one of medical devices (e.g., various portable medical measurement devices (e.g., a blood glucose monitoring device, a heartbeat measuring device, a blood pressure measuring device, a body temperature measuring device, and the like)), a magnetic resonance angiography (MRA), a magnetic resonance imaging (MRI), a computed tomography (CT), scanners, and ultrasonic devices), navigation devices, global positioning system (GPS) receivers, event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs) of finance institutions, points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment of the present disclosure, the electronic devices may include at least one of furniture or a portion of buildings/structures, electronic boards, electronic signature receiving devices, projectors, or various measuring instruments (e.g., water meters, electricity meters, gas meters, or wave meters, and the like). In various embodiments, the electronic devices may be one or more combinations of the above-mentioned devices. According to an embodiment, an electronic device may be a flexible electronic device. Also, electronic devices according to various embodiments of the present disclosure are not limited to the above-mentioned devices, and may include new electronic devices according to technology development.

Hereinafter, various embodiments will be described in detail with reference to the accompanying drawings. However, sizes of the elements in the drawings may be exaggerated or reduced for convenience of explanation. For example, size and thickness of each element illustrated in the drawings are arbitrarily shown for convenience of explanation and thus the present disclosure is not limited to those illustrated in the drawings.

In addition, an orthogonal coordinates system is used, but the x-axis, y-axis, and z-axis are not limited to three axes on the orthogonal coordinate system and may be interpreted as including the same in a wide sense. For example, the x-axis, y-axis, and z-axis are orthogonal to one another, but may indicate different directions which are not orthogonal to one another.

FIG. 1 is a view showing an example of using a gimbal device according to various embodiments of the present disclosure. Referring to FIG. 1, the gimbal device 100 according to various embodiments of the present disclosure may include a gimbal 110, a handle 120, and a joint 130 pivotably coupling the gimbal 110 and the handle 120 to each other.

The gimbal 110 may include a holder 111, a plurality of motors 112a, 112b, 112c, and an angular velocity sensor 113. The holder 111 may be configured to hold another electronic device 140 including an image capturing device (for example, a camera module). Another electronic device 140 may include, for example, at least one of a smart phone, a tablet PC, a mobile phone, a camera, and a wearable electronic device. The holder 111 may have an appropriate shape so as to allow another electronic device 140 to be removably mounted therein. For example, the holder 111 may include side arms configured to surround and fix both side surfaces of another electronic device 140. The angular velocity sensor 113 may be disposed in a region of the holder 111. The angular velocity sensor 113 may include a six-axis sensor (or a six-axis acceleration/gyro sensor, a six-axis combo sensor) or the like. The angular velocity sensor 113 may be configured to detect an amount of pivotal movement of the holder 111 and another electronic device 140 mounted in the holder 111, for example, an amount of pivotal movement in pitch, roll, and yaw-axis directions. Accordingly, the angular velocity sensor 113 may detect an angle of inclination with respect to acceleration of gravity of the holder 111, and may detect an angle and a position at which the holder 111 and/or another electronic device 140 are.

The plurality of motors 112a, 112b, 112c may be coupled to the holder 111 to provide a driving force to pivot the holder 111 and another electronic device 140 mounted in the holder 111 on the pitch, roll, and yaw axes. In an embodiment, the holder 111 may pivot on the pitch axis by using the first motor 112a, and may pivot on the roll axis by using the second motor 112b. In addition, the holder 111 may pivot on the yaw axis by using the third motor 112c. The plurality of motors 112a, 112b, 112c may be disposed within a range without interfering with one another when pivoting. For example, the first motor 112a may be fixedly coupled to one end of the holder 111 and may be coupled to the second motor 112b through a connection member. The second motor 112b may also be coupled to the third motor 112c through a connection member. The connection members may physically couple the plurality of motors 112a, 112b, 112c, and may have electric wires, etc. embedded therein to electrically couple the plurality of motors 112a, 112b, 112c or to provide an electric current from a battery.

The handle 120 may be fixedly coupled to the gimbal 110. A user of the gimbal device 100 may grip the handle 120 and may capture an image by using another electronic device 140 mounted in the holder 111. The handle 120 may have an appropriate shape so as to allow the user of the gimbal device 100 to grip the handle 120 with one hand. The gimbal device 100 according to various embodiments of the present disclosure may detect an amount of pivotal movement of another electronic device 140 caused by a user's movement or shake by using the angular velocity sensor 113, and may compensate for the detected amount of pivotal movement by pivoting the holder 111 in a reverse direction according to the detected amount of pivotal movement by using the plurality of motors 112a, 112b, 112c, thereby providing an environment where another electronic device 140 captures a clear image without shaking.

The joint 130 may include a hinge structure so as to allow the gimbal 110 and the handle 120 to have various angles therebetween. For example, the joint 130 may be configured to cause the gimbal 110 and the handle 120 to form a substantially straight line when not pivoting. In another example, the joint 130 may be configured to pivot by 90 degrees and thus to allow the gimbal 110 and the handle 120 to have an included angle of 90 degrees therebetween. In still another example, the joint 130 may be configured to have an included angle of −90 degrees (or 270 degrees). That is, the gimbal device 100 according to various embodiments of the present disclosure may provide a using example in which the gimbal 110 has various angles with respect to the handle 120 by a pivotal movement of the joint 130, and may provide various photographing experiences to the user. Various using examples of the gimbal device 100 of the present disclosure provided by the pivotal movement of the joint 130 will be described in detail below.

Figure 2:
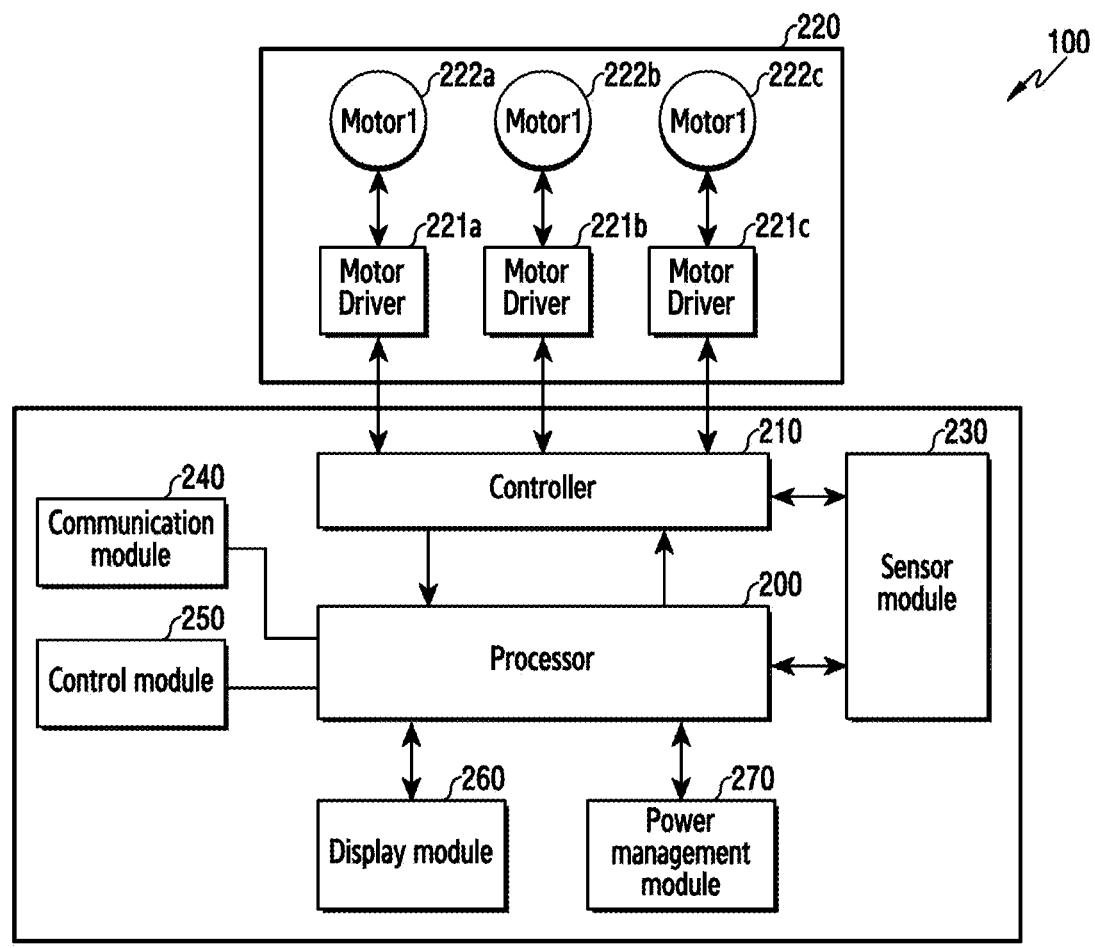
FIG. 2 is a block diagram showing a functional configuration of a gimbal device according to various embodiments of the present disclosure.

FIG. 2 is a block diagram showing a functional configuration of a gimbal device according to various embodiments of the present disclosure. The functional configuration illustrated in FIG. 2 may be included in the gimbal device 100 illustrated in FIG. 1.

Referring to FIG. 2, the gimbal device 100 may include a processor 200, a control module 210, a movement module 220, a sensor module 230, a communication module 240, a controller 250, a display module 260, and a power management module 270.

The processor 200 may control an overall operation of the gimbal device 100. For example, the processor 200 may control at least one other element of the gimbal device 100. In another example, the processor 200 may perform an operation or process data in relation to a movement of the holder 111 of the gimbal device 100.

The control module 210 may control rotation of a plurality of motors 222a, 222b, 222c by using position and posture information of the gimbal device 100 and/or position and posture information of the holder 111. The movement module 220 may control a position and an angle of the holder 111 based on the control of the control module 210. The movement module 220 may include at least one motor and at least one motor drive. According to various embodiments of the present disclosure, the gimbal device 100 may be a three-axis gimbal device. The movement module 220 of the three-axis gimbal device may include three motors and motor drives to drive the motors, respectively. For example, the movement module 220 may include a first motor drive 221a and a first motor 222a for providing a rotational force of a first axis, a second motor drive 221a and a second motor 222b for providing a rotational force of a second axis perpendicular to the first axis, and a third motor drive 221c and a third motor 222c for providing a rotational force of a third axis perpendicular to the first axis and the second axis. In a using example, the first axis may be a pitch axis, the second axis may be a roll axis, and the third axis may be a yaw axis. However, the embodiments are not limited thereto, and the gimbal device 100 may be a two-axis gimbal device. A movement module of the two-axis gimbal device may include two motors and motor drives for driving the motors, respectively. In a using example, the motors and the motor drives may provide rotational forces of the pitch and roll axes.

The sensor module 230 may measure a physical quantity or detect an operation state of the gimbal device 100, and may convert the detected information into an electric signal. The sensor module 230 may include a first angular velocity sensor for detecting an amount of pivotal movement of the holder 111, and a second angular velocity sensor for detecting a grip state of the handle 120. According to various embodiments, the sensor module 230 may be disposed in the joint 130 to detect a pivot state or an amount of pivotal movement of the joint 130. The sensor module 230 may further include sensors having various other functions.

The control module 210 according to various embodiments of the present disclosure may control the movement module 220 to compensate for an amount of pivotal movement of the holder 111 detected by using the sensor module 230. The control module 210 may control the motor drives 221a, 221b, 221c to drive the plurality of motors 222a, 222b, 222c to rotate in the reverse direction to the detected amount of pivotal movement.

The communication module 240 may be a wireless communication module. The communication module 240 may include a radio frequency (RF) module, a cellular module, a Wi-Fi module, a Bluetooth (BT) module, and/or a global positioning system (GPS) module. The communication module 240 may enable the gimbal device 100 to transmit or receive signals to or from another electronic device 140. For example, the gimbal device 100 may interlock the Wi-Fi module and the RF module to transmit or receive signals to or from another electronic device 140 via a wireless local area network (WLAN). Alternatively, the gimbal device 100 may interlock the BT module and the RF module to transmit or receive signals to or from another electronic device 140 by using a proximity direct communication service.

The controller 250 may receive various signals for operating the gimbal device 100. For example, the controller 250 may include various inputting means including a button method, a touch screen method, a joystick method, a jog key method, and a dial method. The processor 200 may operate the gimbal device 100 in various operation modes based on various signals received from the controller 250. According to various embodiments, the operation mode may include a normal mode in which the balance of the holder 111 is maintained, a tracing mode in which a focus of a photographing device is fixed along a specific subject, or a manual control mode in which the angle of the holder 111 is manually controlled.

The display module 260 may display a specific state of the gimbal device 100 or a portion thereof (for example, the processor 200), for example, a booting state, a message state, or a charging state. According to various embodiments, the display module 260 may include a touch screen panel, a light emitting diode (LED) indicator, etc.

The power management module 270 may manage, for example, power of the gimbal device 100, for example. According to various embodiments, the power management module 270 may include a power management integrated circuit (PMIC), a charger IC, or a battery or a fuel gauge. The PMIC may have a wired charging method and/or a wireless charging method. The wireless charging method may include, for example, a magnetic resonance method, a magnetic induction method or an electromagnetic method, and may further include an additional circuit for wirelessly charging, for example, a coil loop, a resonant circuit, or a rectifier, and the like. The battery may include, for example, a rechargeable battery and/or a solar battery.

Each of the above-mentioned elements of the present disclosure may be configured with one or more components, and the names of the elements may be changed according to the type of the electronic device. According to various embodiments, some elements of the gimbal device (for example, the gimbal device 100) may be omitted or other additional elements may be added. Furthermore, some of the elements may be combined with each other so as to form one entity, so that the functions of the elements may be performed in the same manner as before the combination. In addition, each of the above-mentioned elements of the present disclosure may be configured with one or more components, and the names of the elements may be changed according to the type of the electronic device. According to various embodiments, the electronic device may include at least one of the above-mentioned elements, and some elements may be omitted or other additional elements may be added. Furthermore, some of the elements of the electronic device according to various embodiments may be combined with each other so as to form one entity, so that the functions of the elements may be performed in the same manner as before the combination.

Figure 3A:
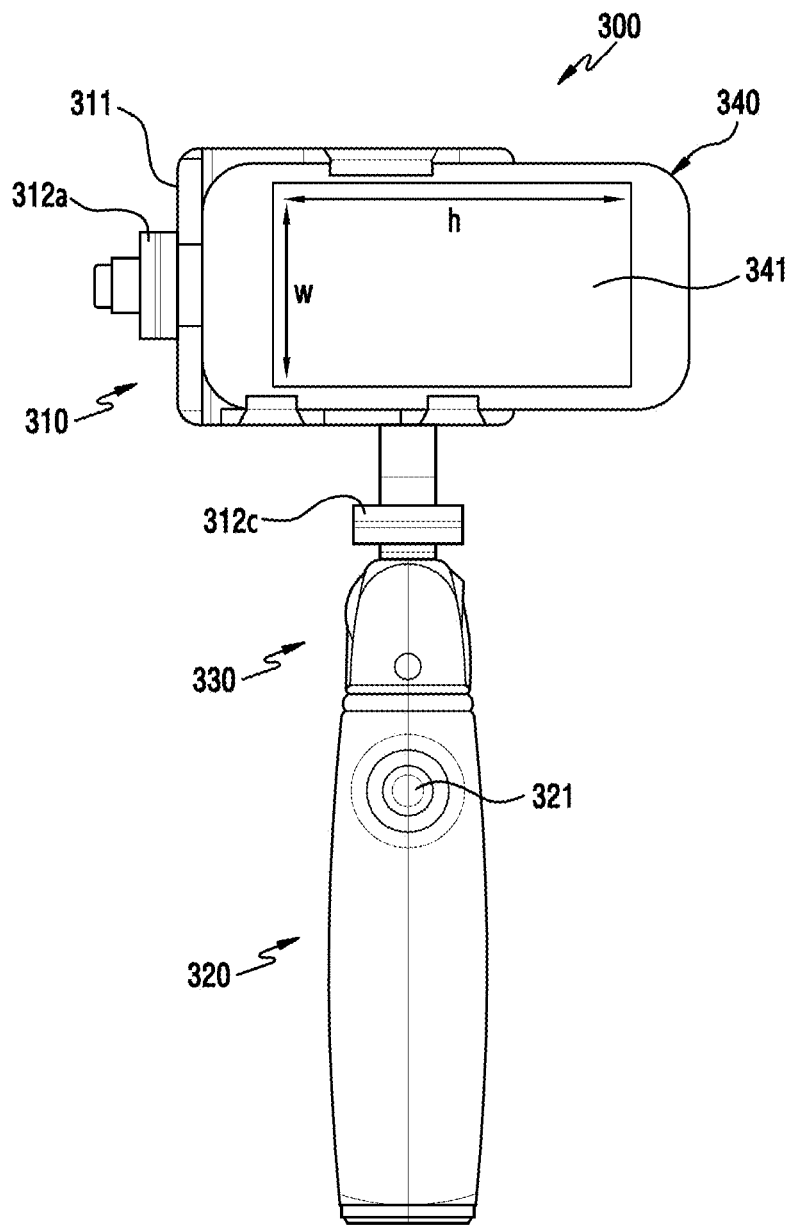
FIG. 3A is a front view showing an example of using a gimbal device according to various embodiments of the present disclosure.
Figure 3B:
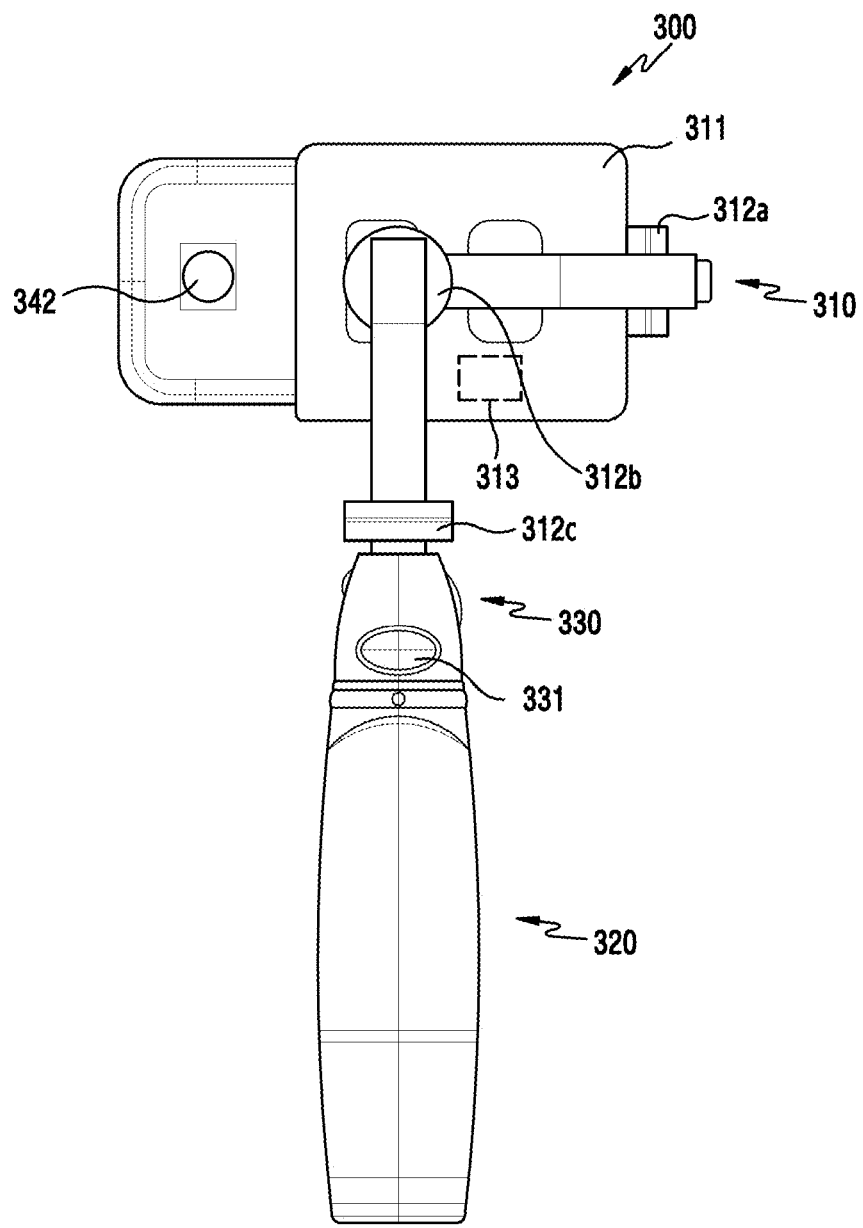
FIG. 3B is a rear view showing an example of using a gimbal device according to various embodiments of the present disclosure.

FIG. 3A is a front view showing an example of using a gimbal device according to various embodiments of the present disclosure, and FIG. 3B is a rear view.

Referring to FIGS. 3A and 3B, the gimbal device 300 according to various embodiments of the present disclosure may include a gimbal 310, a handle 320, and a joint 330. The joint 330 may pivotably couple the gimbal 310 and the handle 320 to each other.

The gimbal 310 may include a holder 311, a plurality of motors 312a, 312b, 312c, and an angular velocity sensor 313. The holder 311 may be configured to hold another electronic device 340 including an image capturing device (for example, a camera module). The plurality of motors 312a, 312b, 312c may be coupled to the holder 311, and may be configured to provide a driving force for pivoting the holder 311 and another electronic device 340 mounted in the holder 311 on the pitch, roll, or yaw axis. The angular velocity sensor 313 may be disposed in the holder 311 to detect an amount of pivotal movement of the holder 311 and another electronic device 340. The plurality of motors 312a, 312b, 312c may pivot the holder 311 so as to compensate for the detected amount of pivotal movement.

The electronic device 340 may include a display 341 having a predetermined area and an image capturing device 342. For example, the display 341 may be disposed on a front surface of the electronic device 340, and the image capturing device 342 may be disposed on a rear surface. According to various embodiments, the display 341 may have a predetermined width (w) and a predetermined height (h). In general, the width (w) of another electronic device 340 may be shorter than the height (h). For example, the width (w) and the height (h) of the display 341 may be configured to have a ratio of 3:4 or a ratio of 8:19. Accordingly, the body of another electronic device 340 may have appropriate width and height corresponding to the display 341.

According to various embodiments, when another electronic device 340 is mounted in the holder 311 of the gimbal device 300, the height (h) of the electronic device 340 longer than the width (w) may be in a horizontal direction. For example, the electronic device 340 may be mounted in the horizontal direction, such that one end of the electronic device 340 is fixed to the holder 311 and the image capturing device 342 disposed at the other end of the electronic device 340 is exposed to the outside. In this case, the electronic device 340 may capture a horizontally long image (or a landscape image) by using the image capturing device 342. That is, the gimbal device 300 according to various embodiments of the present disclosure may provide a using example of a "horizontal mode" in which the image capturing device 342 captures a horizontally long image. In other words, the electronic device 340 including the image capturing device 342 may be mounted in the holder 311 in the horizontal direction in a configuration where the joint 330 of the gimbal device 300 does not pivot and the gimbal 310 and the handle 320 forms a substantially straight line (or an included angle between the gimbal 310 and the handle 320 is 180 degrees). This configuration may be referred to as a first configuration or a horizontal configuration.

According to various embodiments of the present disclosure, the joint 330 may be disposed on a position where the center of gravity of the gimbal 310 and another electronic device 340 is maintained even when the joint 330 pivots. For example, the joint 330 may be disposed right under a motor responsible for pivoting in the yaw-axis direction. Specifically, the joint 330 may be disposed between a lower end of the third motor 312c and an upper end of the handle 320. However, embodiments are not limited thereto, and the position of the joint 330, in particular, the position of the pivotal axis of the joint 330, may be appropriately designed.

Figure 4:
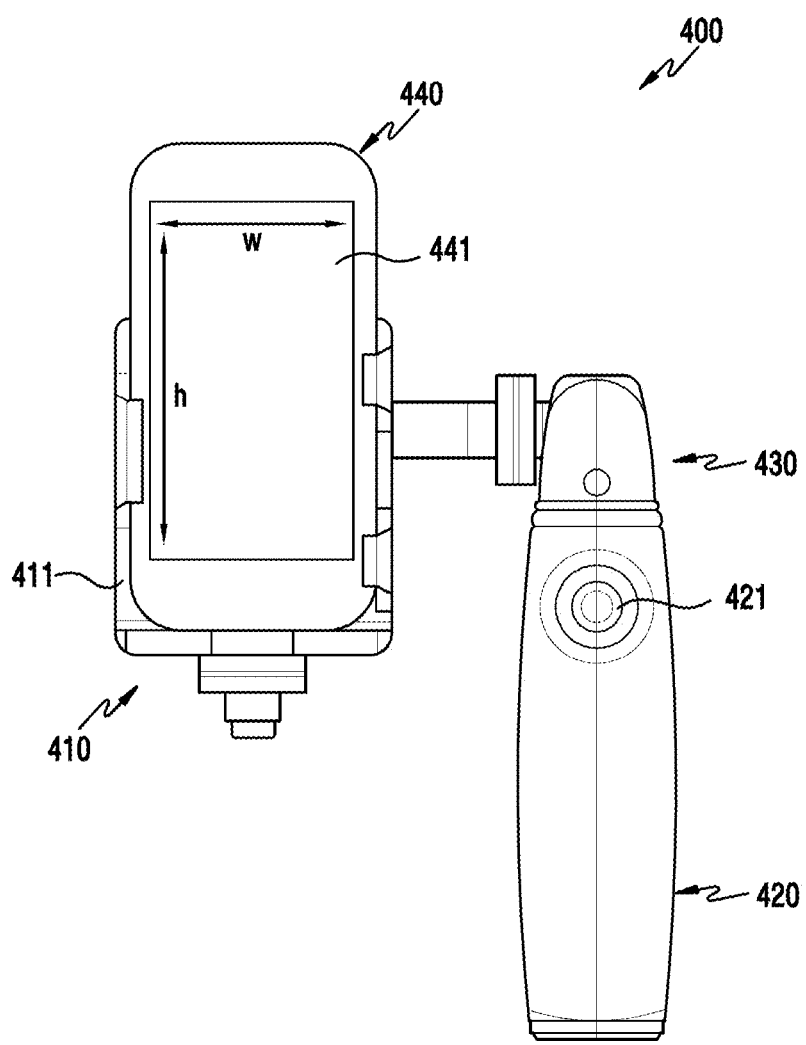
FIG. 4 is a front view showing another example of using a gimbal device according to various embodiments of the present disclosure.

FIG. 4 is a front view showing another example of using a gimbal device according to various embodiments of the present disclosure. The gimbal device 400 illustrated in FIG. 4 may be a similar or same device to or as the gimbal device 300 illustrated in FIGS. 3A and 3B.

Referring to FIG. 4, the gimbal device 400 according to various embodiments of the present disclosure provides a using example of a "vertical mode." For example, a joint 430 of the gimbal device 400 may pivot so as to cause a gimbal 410 to have an angle of 90 degrees with respect to a handle 420, When an electronic device 440 is mounted in a holder 411 of the gimbal device 400, a load applied to each axis (for example, a load applied to each motor) may be constant regardless of the direction of gravity. Accordingly, the electronic device 440 may maintain a balance with the gimbal 410 regardless of an included angle between the handle 420 and the gimbal 410, which is changed by pivotal movement of the joint 430 disposed at an end of the gimbal 410.

Accordingly, even when another electronic device 440 is mounted in the horizontal direction with respect to the gimbal 410, the electronic device 440 may capture an image in the vertical direction by a bending or pivotal movement of the joint 430. Herein, the "vertical mode" may be referred to as a second configuration or a vertical configuration. That is, the gimbal device 400 according to various embodiments of the present disclosure may provide convenience of capturing a vertically long image (or a portrait image) by the pivotal movement of the joint 330, without requiring the user to hold the handle 420 in the horizontal direction or to re-mount the electronic device 440 in the vertical direction.

Figure 5A:
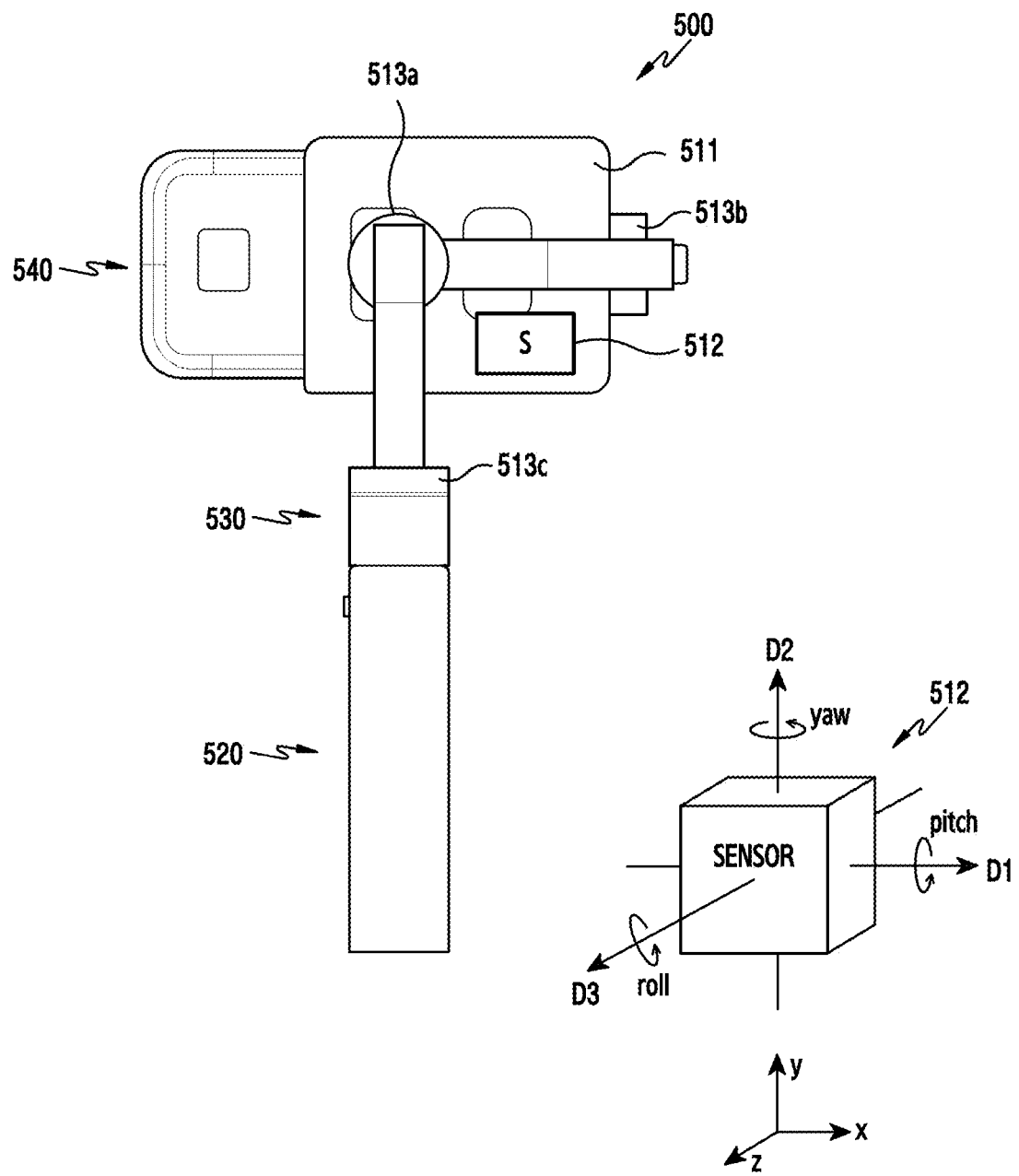
FIG. 5A is a view showing axis assignment information of an angular velocity sensor in an example of using a gimbal device according to various embodiments of the present disclosure.
Figure 5B:
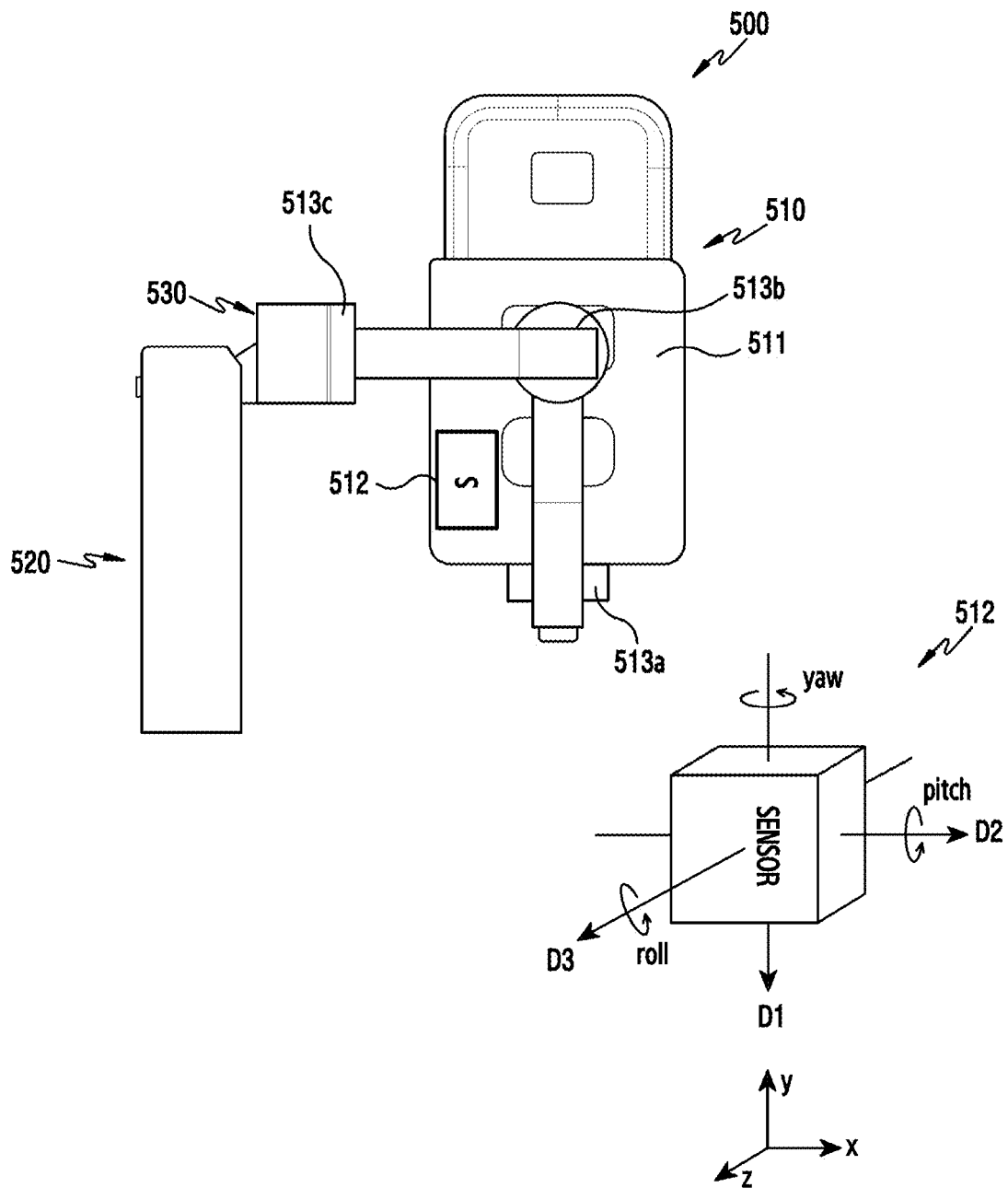
FIG. 5B is a view showing axis assignment information of an angular velocity sensor in another example of using a gimbal device according to various embodiments of the present disclosure.
Figure 5C:
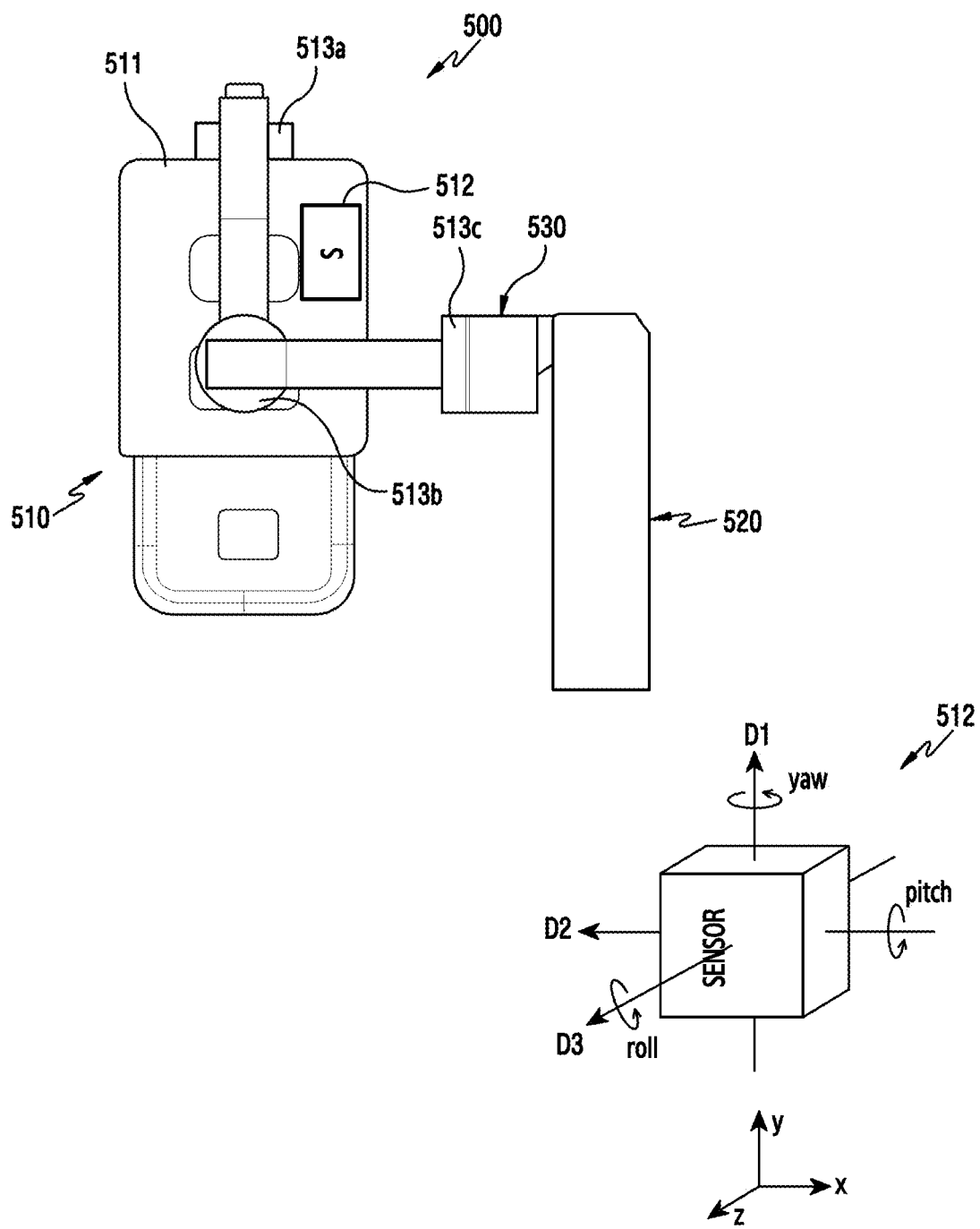
FIG. 5C is a view showing axis assignment information of an angular velocity sensor in still another example of using a gimbal device according to various embodiments of the present disclosure.

FIGS. 5A to 5C are views showing information of axis assignment (or matching information) regarding a detection value of an angular velocity sensor, and setting information of a plurality of motors in various using examples of a gimbal device according to various embodiments of the present disclosure. The gimbal device 500 illustrated in FIGS. 5A to 5C may be a similar or same device to or as the gimbal device 300 illustrated in FIGS. 3A and 3B. Referring to FIGS. 5A to 5C, operations of the gimbal device according to various embodiments of the present disclosure, of identifying axis information assigned to detection values of three axes which are obtained by using the angular velocity sensor in various modes (or configurations), and identifying setting information of the plurality of motors will be described.

Referring to FIG. 5A, the gimbal device 500 according to various embodiments of the present disclosure may operate in a horizontal mode. An angular velocity sensor 512 according to various embodiments may be disposed in a holder 511 to detect an amount of pivotal movement made on an axis of a first direction (D1) (or an x direction), on an axis of a second direction (D2) (or a y direction), and on an axis of a third direction (D3) (or a z direction). The opposite direction (−y-axis direction) of the second direction (D2) of the angular velocity sensor 512 may the direction of gravity.

According to various embodiments of the present disclosure, the gimbal device 500 may identify or change axis assignment of detection values obtained by using the angular velocity sensor 512, and setting information of a plurality of motors 513a, 513b, 513c according to an operation mode (or a configuration) of the gimbal device 500. For example, in the horizontal mode, the gimbal device 500 may assign a detection value of the first direction (D1) obtained by the angular velocity sensor 512 to the pitch axis, assign a detection value of the second direction (D2) to the yaw axis, and assign a detection value of the third direction (D3) to the roll axis. Accordingly, the detection value of the first direction (D1) may be identified as an amount of pivotal movement on the pitch axis, and the detection value of the second direction (D2) may be identified as an amount of pivotal movement on the yaw axis.

According to various embodiments of the present disclosure, the gimbal device 500 may identify or change the setting information of the plurality of motors 513a, 513b, 513c according to the identified or changed axis assignment information regarding the detection values of the angular velocity sensor 512. For example, in the horizontal mode, the first motor 513a may be set to pivot on the pitch axis in the forward direction, the second motor 513b may be set to pivot on the roll axis in the forward direction, and the third motor 513c may be set to pivot on the yaw axis in the forward direction. However, embodiments are not limited thereto, and the gimbal device 500 may have appropriate setting information according to positions and angles of the plurality of motors and the angular velocity sensor.

Referring to FIG. 5B, the gimbal device 500 according to various embodiments of the present disclosure may operate in a first vertical mode (or a second configuration). For example, the joint 530 may pivot in one direction (for example, +x-axis direction), and an included angle of the gimbal 510 with reference to the handle 520 may be 90 degrees. Alternatively, when the user views the display of the held electronic device, the gimbal 510 may be positioned on the left relative to the handle 520. In this case, even when another electronic device 540 is mounted in the holder 511 in the horizontal direction, the image capturing device 541 may be positioned on the upper end and may capture a vertically long image. According to various embodiments, the angular velocity sensor 512 disposed in the holder 511 may detect an amount of pivotal movement of the first direction (D1) (or −y-axis direction), the second direction (D2) (or the x-axis direction), and the third direction (D3) (or the z-axis direction). Herein, the first direction (D1) of the angular velocity sensor 512 may be the direction of gravity.

According to various embodiments of the present disclosure, the gimbal device 500 may identify or change axis assignment of detection values of the three axes obtained by using the angular velocity sensor 512, and setting information of the plurality of motors 513a, 513b, 513c according to an operation mode (or configuration) of the gimbal device 500. For example, in the first vertical mode, the gimbal device 500 may assign (or match) a detection value of the opposite direction of the first direction (D1) obtained by the angular velocity sensor 512 to the yaw axis, assign a detection value of the second direction (D2) to the pitch axis, and assign a detection value of the third direction (D3) to the roll axis. Accordingly, the detection value of the opposite direction of the first direction (D1) may be identified as an amount of pivotal movement on the yaw axis, and the detection value of the second direction (D2) may be identified as an amount of pivotal movement on the pitch axis.

According to various embodiments of the present disclosure, the gimbal device 500 may identify or change the setting information of the plurality of motors 513a, 513b, 513c according to the identified or changed axis assignment information regarding the detection values of the angular velocity sensor 512. For example, in the first vertical mode, the first motor 513a may be set to pivot on the yaw axis in the reverse direction, the second motor 513b may be set to pivot on the roll axis in the forward direction, and the third motor 513c may be set to pivot on the pitch axis in the reverse direction. However, embodiments are not limited thereto, and the gimbal device 500 may have appropriate setting information according to positions and angles of the plurality of motors and the angular velocity sensor.

Referring to FIG. 5C, the gimbal device 500 according to various embodiments of the present disclosure may operate in a second vertical mode (or a third configuration). For example, the joint 530 may pivot in one direction (for example, −x-axis direction), and an included angle of the gimbal 510 with reference to the handle 520 may be 270 degrees. Alternatively, when the user views the display of the held electronic device, the gimbal 510 may be positioned on the right relative to the handle 520. In this case, even when another electronic device 540 is mounted in the holder 511 in the horizontal direction, the image capturing device 541 may be positioned on the lower end and may capture a vertically long image. According to various embodiments, the angular velocity sensor 512 disposed in the holder 511 may detect an amount of pivotal movement of the first direction (D1) (or y-axis direction), the second direction (D2) (or −x-axis direction), and the third direction (D3) (or z-axis direction). Herein, the opposite direction of the first direction (D1) of the angular velocity sensor 512 may be the direction of gravity.

According to various embodiments of the present disclosure, the gimbal device 500 may identify or change axis assignment information regarding detection values of the angular velocity sensor 512, and setting information of the plurality of motors 513a, 513b, 513c according to an operation mode (or configuration) of the gimbal device 500. For example, in the second vertical mode, the gimbal device 500 may assign (or match) a detection value of the first direction (D1) obtained by the angular velocity sensor 512 to the yaw axis, assign a detection value of the opposite direction of the second direction (D2) to the pitch axis, and assign a detection value of the third direction (D3) to the roll axis.

According to various embodiments of the present disclosure, the gimbal device 500 may identify or change the setting information of the plurality of motors 513a, 513b, 513c, based on the changed axis assignment information regarding the detection values of the angular velocity sensor 512. For example, in the second vertical mode, the first motor 513a may be set to pivot on the yaw axis in the forward direction, the second motor 513b may be set to pivot on the roll axis in the forward direction, and the third motor 513c may be set to pivot on the pitch axis in the forward direction. However, embodiments are not limited thereto, and the gimbal device 500 may have appropriate setting information according to positions and angles of the plurality of motors and the angular velocity sensor.

Referring to FIGS. 5B and 5C, the gimbal device 500 according to various embodiments of the present disclosure may provide an appropriate using example according to whether the handle 520 is gripped by the user's right hand or left hand. For example, the user may grip the handle 520 of the gimbal device 500 in the first vertical mode with user's right hand, and may control another electronic device with user's left hand. In this case, another electronic device is positioned on the left relative to the handle 520, such that enhanced convenience in controlling can be provided to the user. In the first vertical mode, the gimbal device 500 may assign the detection value of the first direction (D1) to the pitch axis, assign the detection value of the second direction (D2) to the yaw axis, and assign the detection value of the third direction (D3) to the roll axis. In another example, the user may grip the gimbal device 500 in the second vertical mode with user's left hand, and may control another electronic device with user's right hand. In this case, another electronic device is positioned on the right relative to the handle 520, such that enhanced convenience in controlling can be provided to the user. In the second vertical mode, the gimbal device 500 may change the axis information by assigning the detection value of the opposite direction of the first direction (D1) to the yaw axis, assigning the detection value of the second direction (D2) to the pitch axis, and assigning the detection value of the third direction (D3) to the roll axis.

Figure 6:
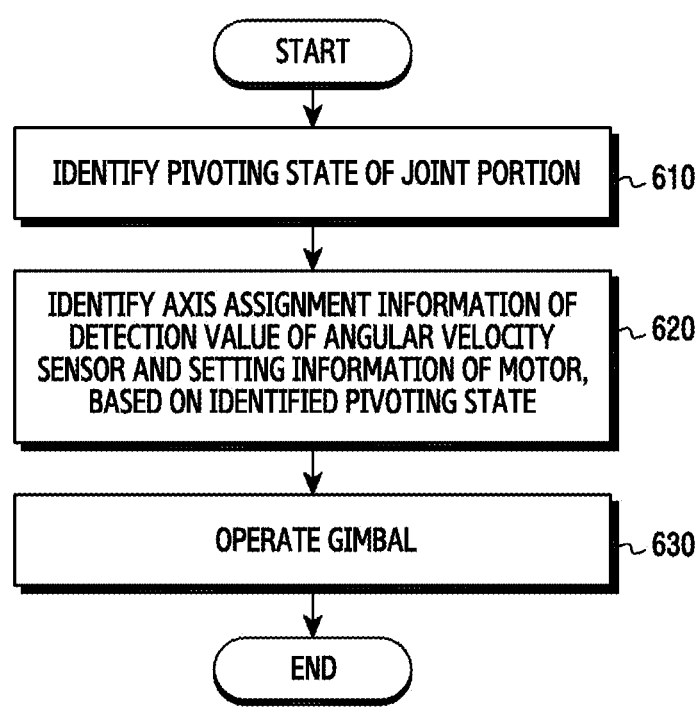
FIG. 6 is a view showing an example of an operation flow of a gimbal device according to various embodiments of the present disclosure.

FIG. 6 is a view showing an example of an operation flow of a gimbal device according to various embodiments of the present disclosure. The gimbal device may be the gimbal device 100 of FIGS. 1 and 2.

Referring to FIG. 6, in step 610, the gimbal device 100 may identify a pivoting state of the joint 130. The joint 130 of the gimbal device 100 may pivotably couple the gimbal 110 and the handle 120 to each other. The user may bend the gimbal 110 in a specific direction with respect to the handle 120 by applying a force, and may use the gimbal 110 in various ways. According to various embodiments, the joint 130 may include the sensor module 230, for example, a position sensor using optics or magnets. Accordingly, the gimbal device 100 may automatically detect a pivoting state or a pivoting angle of the joint 130 by using the position sensor. For example, the gimbal device 100 may automatically identify whether the gimbal 110 and the handle 120 form a substantially straight line when the joint 130 does not pivot, by using the position sensor. In this case, the gimbal device 100 may identify that the gimbal device 100 operates in the horizontal mode. In another example, it may be identified whether the joint 130 pivots in a specific direction and the gimbal 110 and the handle 120 are configured to have an included angle of 90 degrees. In this case, it may be identified that the gimbal device 100 operates in the first vertical mode. In still another example, it may be identified whether the joint 130 pivots in the opposite direction of the specific direction and the gimbal 110 and the handle 120 are configured to have an included angle of 270 degrees. In this case, it may be identified that the gimbal device 100 operates in the second vertical mode. In other words, in step 610, the gimbal device 100 may identify in which state the elements including the joint 130 operate.

According to another embodiment, the gimbal device 100 may identify a current pivoting state or pivoting angle of the joint 130 according to a user's manual input through an inputting means (for example, the controller 250). For example, when the user inputs information of the horizontal mode by using a dial key of the controller 250, the gimbal device 100 may identify the operation mode as the horizontal mode based on the inputted information.

In step 620, the gimbal device 100 may identify axis assignment information regarding detection values of the angular velocity sensor, and setting information of the motors, based on the identified pivoting state. In other words, a main process unit (for example, the processor 200 of FIG. 2) of the gimbal device 100 may automatically assign the pitch, yaw, and roll axes to detection values of the axes obtained by using the angular velocity sensor, according to at least one of the identified pivoting state and/or operation mode, and may identify roles and pivoting directions of the motors.

For example, when it is identified that the joint 130 does not pivot (or the gimbal device 100 is in the horizontal mode), the gimbal device 100 may identify a detection value of the first direction (D1) of the angular velocity sensor 113 as the pitch axis, a detection value of the second direction (D2) as the yaw axis, and a detection value of the third direction (D3) as the roll axis. In addition, the first motor 112a may be set to pivot on the pitch axis in the forward direction, the second motor 112b may be set to pivot on the roll axis in the forward direction, and the third motor 112c may be set to pivot on the yaw axis in the forward direction.

In another example, when it is identified that the joint 130 pivots in a specific direction by 90 degrees (or the gimbal device 100 is in the first vertical mode), the gimbal device 100 may identify a detection value of the opposite direction of the first direction (D1) of the angular velocity sensor 113 as the yaw axis, identify a detection value of the second direction (D2) as the pitch axis, and identify a detection value of the third direction (D3) as the roll axis. In addition, the first motor 112a may be set to pivot on the yaw axis in the reverse direction, the second motor 112b may be set to pivot on the roll axis in the forward direction, and the third motor 112c may be set to pivot on the pitch axis in the reverse direction.

In still another example, when it is identified that the joint 130 pivots in the opposite direction of the specific direction by 90 degrees (or the gimbal device 100 is in the second vertical mode), the gimbal device 100 may assign a detection value of the first direction (D1) of the angular velocity sensor 113 to the yaw axis, assign a detection value of the opposite direction of the second direction (D2) to the pitch axis, and assign a detection value of the third direction (D3) to the roll axis. In addition, the first motor 112a may be set to pivot on the yaw axis in the forward direction, the second motor 112b may be set to pivot on the roll axis in the forward direction, and the third motor 112c may be set to pivot on the pitch axis in the forward direction.

In operation 630, the gimbal device 100 may operate based on the axis assignment information of the angular velocity sensor and the setting information of the motors. According to various embodiments of the present disclosure, the gimbal device 100 may detect an amount of pivotal movement of the holder 111 and another electronic device 140 mounted in the holder 111, which is sensed by the angular velocity sensor, and may operate to control the plurality of motors 112a, 112b, 112c to compensate for the detected amount of pivotal movement. According to various embodiments of the present disclosure, the processor 200 may identify a pivoting state of the joint 130 by receiving the amount of pivotal movement detected by using the position sensor of the sensor module 230. Alternatively, the processor 200 may receive operation mode information of the gimbal device 100 inputted by the user from the controller 250, and may identify the operation mode information. The processor 200 may identify axis assignment information regarding detection values of the angular velocity sensor and setting information of the plurality of motors 112a, 112b, 112c, based on the identified pivoting state or operation mode. The processor 200 may analyze the amount of pivotal of the holder 111, which is received from the angular velocity sensor, based on the identified axis assignment information regarding the detection values of the angular velocity sensor and the setting information of the plurality of motors 112a, 112b, 112c, and may transmit control command information to the control module 210 to drive the plurality of motors 112a, 112b, 112c to compensate for the amount of pivotal movement.

According to various embodiments, as shown in table 1 presented below, the gimbal device 100 may manage the operation (step 620) of assigning axis information (pitch, yaw, roll) to detection values of the three axes obtained by using the angular velocity sensor, based on the identified pivoting state or operation mode, and of identifying setting information of the motors based on the axis information. The angular velocity sensor may include reference directions by setting the x-axis direction to the first direction, the y-axis direction to the second direction, and the z-axis direction to the third direction with reference to the horizontal mode. In addition, in the following table 1, the first direction may be indicated by D1, the second direction may be indicated by D2, and the third direction may be indicated by D3.

TABLE 1

|  |  | Horizontal mode (first configuration) | First vertical mode (second configuration) | Second vertical mode (third configuration) |
|---|---|---|---|---|
| Assignment of angular velocity sensor | Direction of gravity | −D2 | −D1 | D1 |
|  | Pivot axis | Pitch: D1<br>Yaw: D2<br>Roll: D3 | Pitch: D2<br>Yaw: −D1<br>Roll: D3 | Pitch: −D2<br>Yaw: D1<br>Roll: D3 |
| Setting Motors | Assignment of motors | Pitch: first motor | Pitch: third motor | Pitch: third motor |

TABLE 1-continued

|  | Horizontal mode (first configuration) | First vertical mode (second configuration) | Second vertical mode (third configuration) |
|---|---|---|---|
| by axis | Yaw: third motor<br>Roll: second motor | Yaw: first motor<br>Roll: second motor | Yaw: first motor<br>Roll: second motor |
| Motor pivoting direction | First motor: forward<br>Second motor: forward<br>Third motor: forward | First motor: reverse<br>Second motor: forward<br>Third motor: reverse | First motor: forward<br>Second motor: forward<br>Third motor: forward |

Figure 7:
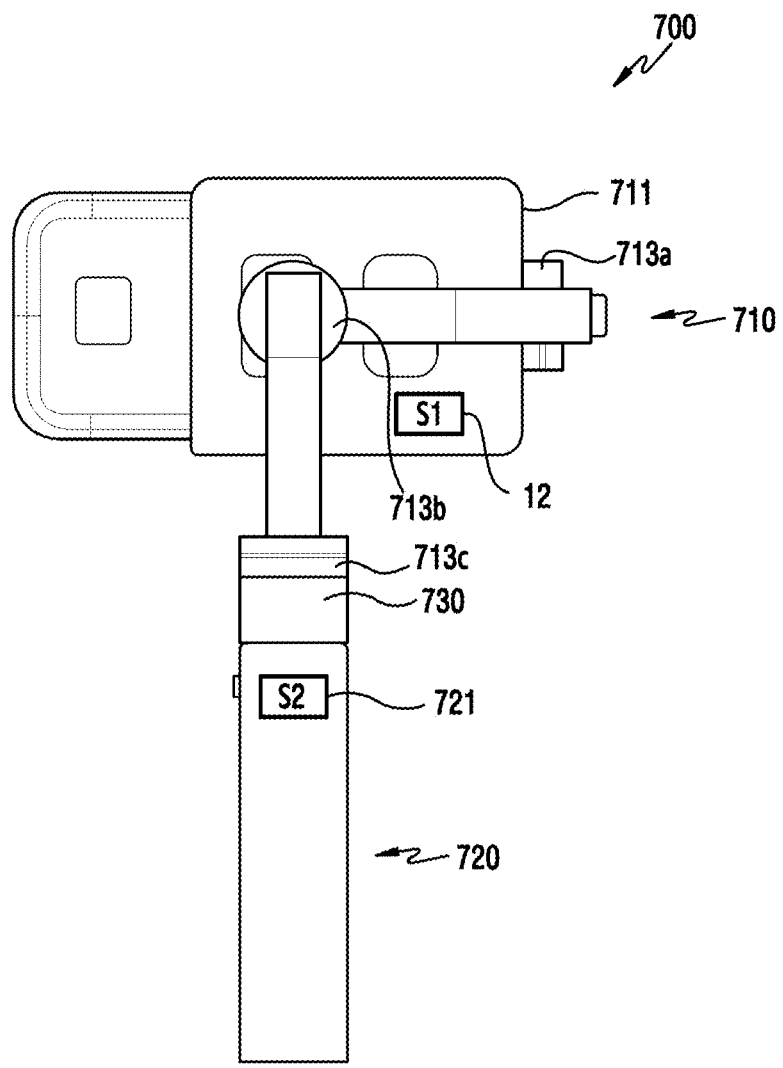
FIG. 7 is a view showing an example of further including a second angular velocity sensor in a gimbal device according to various embodiments of the present disclosure.

FIG. 7 is a view showing an example of further including a second angular velocity sensor in a gimbal device according to various embodiments of the present disclosure. The gimbal device 700 illustrated in FIG. 7 may be a similar or same device to or as the gimbal device 300 illustrated in FIGS. 3A and 3B. Referring to FIG. 7, an embodiment in which the gimbal device according to various embodiments of the present disclosure includes another angular velocity sensor will be explained.

Referring to FIG. 7, the gimbal device 700 according to various embodiments of the present disclosure may include a gimbal 710, a handle 720, and a joint 730 pivotably coupling the gimbal 710 and the handle 720 to each other. The gimbal 710 may include a holder 711 and a first angular velocity sensor 712 disposed in the holder 711. According to various embodiments, the handle 720 may include a second angular velocity sensor 721. The first angular velocity sensor 712 may detect position and angle information of the holder 711, and the second angular velocity sensor 721 may detect position and angle information of the handle 720. The gimbal device 700 may detect an angle of the handle 720 gripped by the user by using the second angular velocity sensor 721 included in the handle 720, and may assign axes of the first angular velocity sensor 712 to pitch, yaw, and roll axes by using the detected angle information, and may identify setting information of a plurality of motors based on the assigned axes.

Figure 8A:
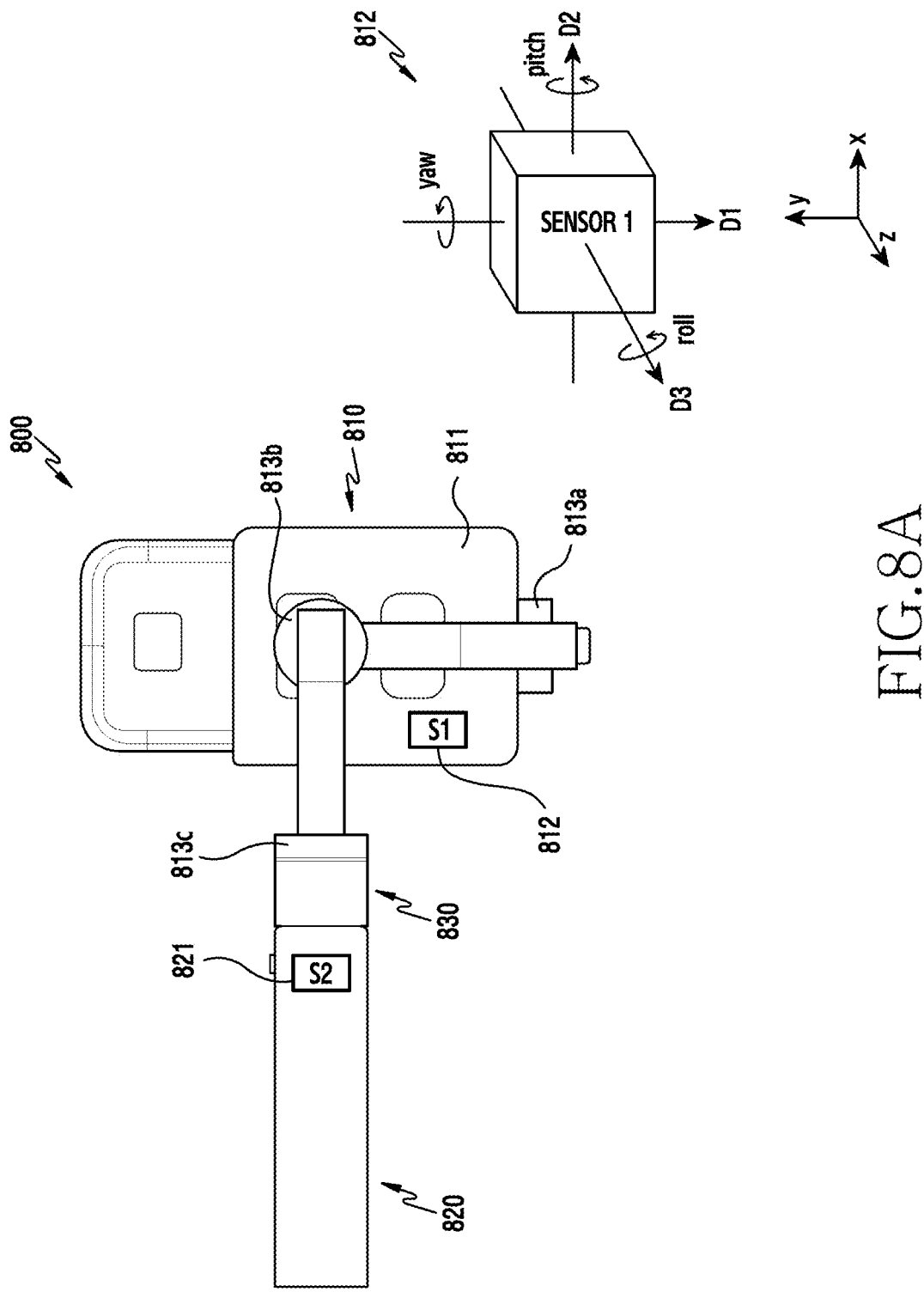
FIG. 8A is a view showing axis assignment information of a first angular velocity sensor in an example of using a gimbal device further including a second angular velocity sensor according to various embodiments of the present disclosure.
Figure 8B:
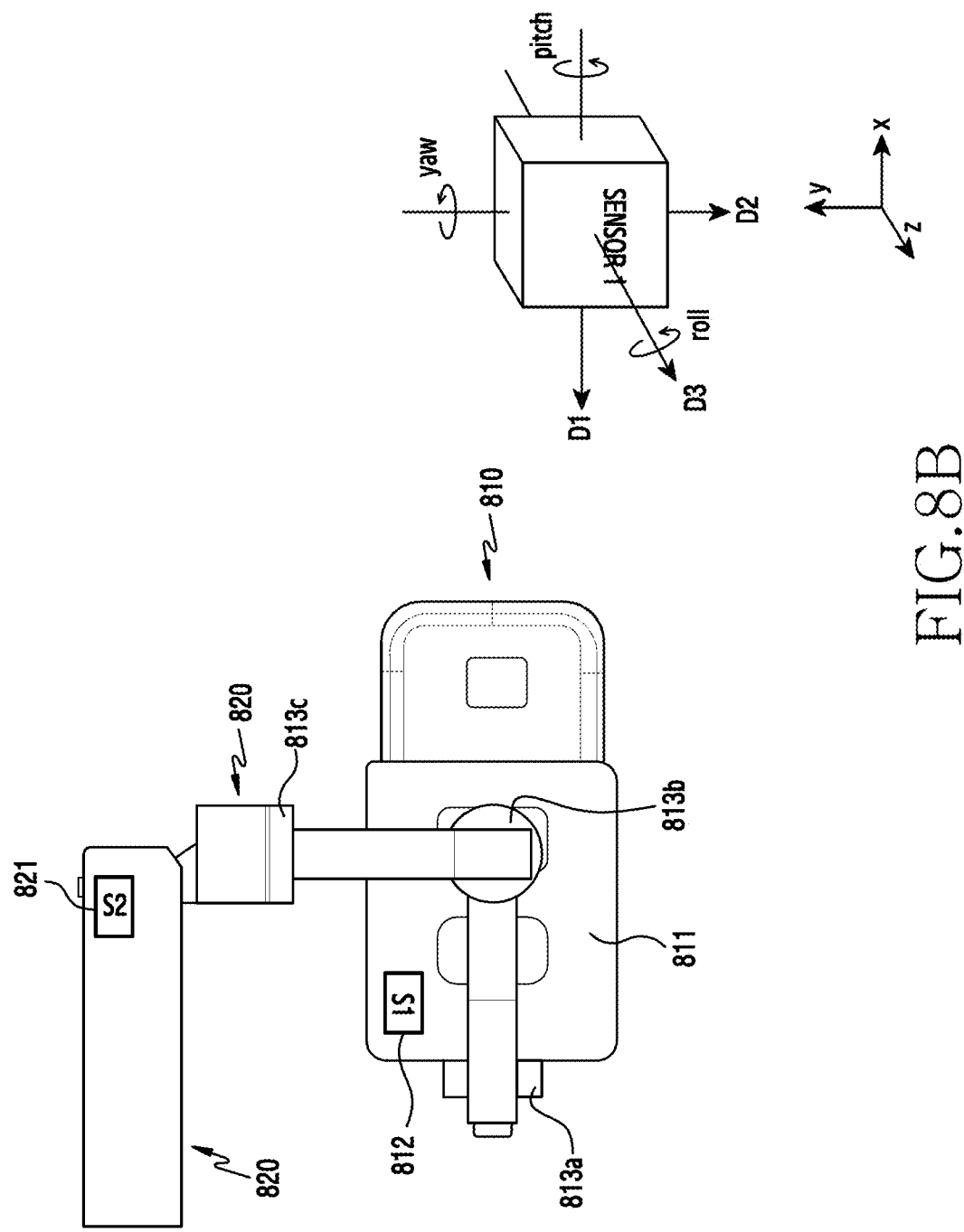
FIG. 8B is a view showing axis assignment information of a first angular velocity sensor in another example of using a gimbal device further including a second angular velocity sensor according to various embodiments of the present disclosure.

FIGS. 8A and 8B are views showing axis assignment information of a first angular velocity sensor and setting information of a plurality of motors in a gimbal device further including a second angular velocity sensor according to various embodiments of the present disclosure. In a using example, setting information of the first angular velocity sensor is illustrated. The gimbal device 800 illustrated in FIGS. 8A and 8B may be a similar or same device to or as the gimbal device 700 illustrated in FIG. 7. Referring to FIGS. 8A and 8B, the operation of the gimbal device according to various embodiments of the present disclosure, of assigning axes of the angular velocity sensor to pitch, yaw, and roll axes in various modes (or configuration), and identifying setting information of the plurality of motors will be described.

Referring to FIG. 8A, the gimbal device 800 according to various embodiments of the present disclosure may be used by the user gripping a handle 820 in a horizontal direction (x-axis direction). When the handle 820 is gripped and used in the horizontal direction, an electronic device may capture a vertically long image even in a state in which a joint 830 does not pivot. That is, when the handle 820 is gripped in the horizontal direction, the user may capture a vertically long image even in the state in which the joint 830 does not pivot. In other words, another electronic device may be mounted in the horizontal direction, but the user may grip the handle 820 horizontally and may capture a vertically long image without having to pivot the joint 830. Such a using example may be referred to as a horizontal-vertical mode or a fourth configuration.

According to various embodiments of the present disclosure, the gimbal device 800 may identify that the gimbal device 800 operates in the horizontal-vertical mode by using a second angular velocity sensor 821. For example, the gimbal device 800 may identify that the handle 820 is griped horizontally by using an angle of the handle 820 detected by the second angular velocity sensor 821. In addition, the gimbal device 800 may identify that the joint 830 dot not pivot (or an angle between the handle 820 and the gimbal 810 is 180 degrees). The gimbal device 800 may identify that the gimbal device 800 operates in the horizontal-vertical mode based on the horizontal grip state of the handle 820 and the state in which the joint 830 does not pivot.

According to various embodiments of the present disclosure, when the gimbal device 800 operates in the horizontal-vertical mode as shown in FIG. 8A, the gimbal device 800 may identify a detection value of the first direction D1 obtained by using the first angular velocity sensor 812 as the direction of gravity, and may assign a detection value of the second direction (D2) to the pitch axis, may assign a detection value of the opposite direction of the first direction (D1) to the yaw axis, and may assign a detection value of the third direction (D3) to the roll axis.

According to various embodiments of the present disclosure, the gimbal device 800 may change setting information of a plurality of motors 813a, 813b, 813c according to the identified axis assignment information of the detection values obtained by using the first angular velocity sensor 812. For example, in the horizontal mode, the first motor 513a may be set to pivot on the yaw axis in the forward direction, the second motor 513b may be set to pivot on the roll axis in the forward direction, and the third motor 513c may be set to pivot on the pitch axis in the forward direction. However, this should not be considered as limiting, and the gimbal device 800 may have appropriate setting information according to positions and angles of the plurality of motors and the angular velocity sensor.

Referring to FIG. 8B, the gimbal device 800 according to various embodiments of the present disclosure may be used by the user gripping the handle 820 in the horizontal direction (x-axis direction). When the handle 820 is gripped and used in the horizontal direction, another electronic device mounted in the holder 811 may also be placed in the horizontal direction by pivoting the joint 830 by 90 degrees. That is, even when the handle 820 is gripped in the horizontal direction, the joint 830 may pivot by 90 degrees and the user may capture a horizontally long image. Such a using example may be referred to as a horizontal-horizontal mode or a fifth configuration.

According to various embodiments of the present disclosure, the gimbal device 800 may identify that the gimbal device 800 operates in the horizontal-horizontal mode by using the second angular velocity sensor 821. For example, the gimbal device 800 may identify that the handle 820 is gripped horizontally by using the angle of the handle 820 detected by the second angular velocity sensor 821. In addition, the gimbal device 800 may identify that joint 830 pivots by 90 degrees (or an angle between the handle 820 and the gimbal 810 is 90 degrees). The gimbal device 800 may identify that the gimbal device 800 operates in the horizontal-horizontal mode based on the identified horizontal grip state of the handle 820, and the pivoting state of the joint 830.

According to various embodiments of the present disclosure, when the gimbal device 800 operates in the horizontal-horizontal mode as shown in FIG. 8B, a detection value of the second direction (D2) obtained by using the first angular velocity sensor 812 may be identified as the direction of gravity, a detection value of the opposite direction of the first direction D1 may be assigned to the pitch axis, a detection value of the opposite direction of the second direction (D2) may be assigned to the yaw axis, and a detection value of the third direction (D3) may be assigned to the roll axis.

The setting information of the plurality of motors 813a, 813b, 813c may be changed according to the change of the axis assignment information regarding the detection values of the first angular velocity sensor 813. For example, in the horizontal mode, the first motor 513a may be set to pivot on the pitch axis in the reverse direction, the second motor 513b may be set to pivot on the roll axis in the forward direction, and the third motor 513c may be set to pivot on the yaw axis in the reverse direction. However, embodiments are not limited thereto, and the gimbal device 800 may have appropriate setting information according to positions and angles of the plurality of motors and the angular velocity sensor.

Figure 9:
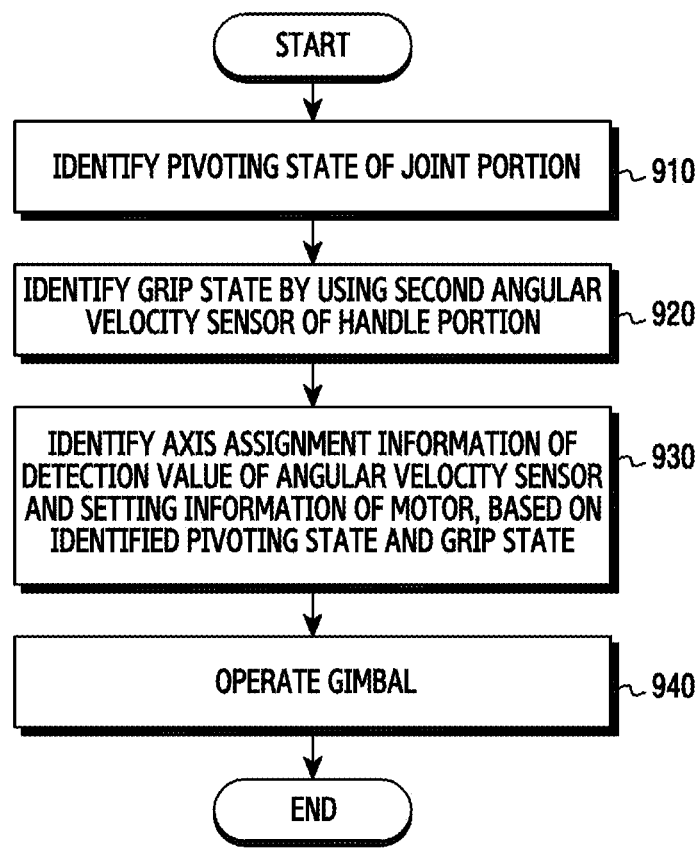
FIG. 9 is a view showing an example of an operation flow of a gimbal device further including a second angular velocity sensor according to various embodiments of the present disclosure.

FIG. 9 is a view showing an example of an operation flow of a gimbal device further including a second angular velocity sensor according to various embodiments of the present disclosure. The gimbal device may be the gimbal device 700 of FIG. 7.

Referring to FIG. 9, in step 910, the gimbal device 700 may identify a pivoting state of the joint 730. The joint 730 of the gimbal device 700 may pivotably couple the gimbal 710 and the handle 720 to each other, and the user may bend the gimbal 710 in a specific direction with respect to the handle 720 by applying a force, and may use the gimbal 710 in various ways. According to various embodiments, the joint 730 may include a sensor module (for example, the sensor module 230 of FIG. 2), for example, a position sensor using optics or magnets. Accordingly, the gimbal device 700 may automatically detect a pivoting state or a pivoting angle of the joint 730 by using the position sensor. For example, the gimbal device 700 may automatically identify whether the gimbal 710 and the handle 720 form a substantially straight line when the joint 730 does not pivot, by using the position sensor. In this case, the gimbal device 700 may identify that the gimbal device 700 operates in the horizontal mode. In another example, it may be identified whether the joint 730 pivots in a specific direction and the gimbal 710 and the handle 720 are configured to have an included angle of 90 degrees. In still another example, it may be identified whether the joint 730 pivots in the opposite direction of the specific direction and the gimbal 710 and the handle 720 are configured to have an included angle of 270 degrees. In yet another example, the gimbal device 700 may identify a current pivoting state or pivoting angle of the joint 730 according to a user's manual input through an inputting means (for example, the controller 250 of FIG. 2). For example, when the user inputs pivoting state information by using a dial key, the gimbal device 700 may identify the inputted information as the pivoting state of the joint 730.

In step 920, the gimbal device 700 may identify a grip state of the handle 720. According to various embodiments of the present disclosure, the gimbal device 700 may identify the grip state of the handle 720 by using the second angular velocity sensor 721 disposed in the handle 720. For example, the second angular velocity sensor 721 may detect whether the user grips the handle 720 in the horizontal direction or in the vertical direction on a real time basis.

In step 930, the gimbal device 700 may identify axis assignment information regarding detection values of the first angular velocity sensor 712 and setting information of the plurality of motors, based on the pivoting state of the joint 730 and the grip state of the handle 720, which are identified in step 910 and step 920, respectively. In other words, the main process unit of the gimbal device 700 may assign the pitch, yaw, and roll axes to detection values of the axes obtained by using the angular velocity sensor, and may identify roles and pivoting directions of the motors, based on the identified pivoting state. For example, when it is determined that the joint 730 does not pivot and the handle 720 is gripped in the horizontal direction, the gimbal device 700 may identify that the gimbal device 700 operates in the horizontal-vertical mode. In this case, the gimbal device 700 may assign the opposite direction of the first direction (D1) of the first angular velocity sensor 712 to the yaw axis, assign the second direction (D2) to the pitch axis, and assign the third direction (D3) to the roll axis. In addition, the first motor 713a may be set to pivot on the yaw axis in the forward direction, the second motor 712b may be set to pivot on the roll axis in the forward direction, and the third motor 712c may be set to pivot on the pitch axis in the forward direction.

As shown in table 2 presented below, the gimbal device 700 may manage the operation (step 930) of assigning axis information (pitch, yaw, roll) to detection values of the three axes obtained by using the angular velocity sensor, based on the identified pivoting state of the joint 730 and the grip state of the handle 720, and of identifying the setting information of the motors based on the axis assignment information. The angular velocity sensor may include reference directions by setting the x-axis direction to the first direction, the y-axis direction to the second direction, and the z-axis direction to the third direction when the handle 720 is griped in the vertical direction and the holder 711 is in the horizontal direction. In addition, in the following table 2, the first direction may be indicated by D1, the second direction may be indicated by D2, and the third direction may be indicated by D3. The operation mode may be displayed as a handle grip state-joint pivoting state. For example, a case in which the handle is griped in the "horizontal" direction and the joint pivots such that the holder is positioned "vertically" to the handle may be displayed as "horizontal-vertical (or second configuration)."

TABLE 2

| | | Pivoting state of the joint | | | |
| | | Not pivoted (180 degrees) | | Pivoted (90 degrees) | |
| | | Grip state of the handle | | | |
| | | Horizontal | Vertical | Horizontal | Vertical |
| | | Operation mode | | | |
| | | Horizontal-horizontal (first configuration) | Vertical-horizontal (fourth configuration) | Horizontal-vertical (second configuration) | Vertical-vertical (fifth configuration) |
| Assignment of | Direction of | −D2 | D1 | −D1 | D2 |
| angular velocity sensor | gravity Pivot axes | Pitch: D1 Yaw: D2 Roll: D3 | Pitch: D2 Yaw: -D1 Roll: D3 | Pitch: D2 Yaw: -D1 Roll: D3 | Pitch: -D1 Yaw: -D2 Roll: D3 |
| Setting motors | Assignment of motors by axes | Pitch: first motor Yaw: third motor Roll: second motor | Pitch: third motor Yaw: first motor Roll: second motor | Pitch: third motor Yaw: first motor Roll: second motor | Pitch: first motor Yaw: third motor Roll: second motor |
| | Motor pivoting direction | First motor: forward Second motor: forward Third motor: forward | First motor: forward Second motor: forward Third motor: forward | First motor: reverse Second motor: forward Third motor: reverse | First motor: reverse Second motor: forward Third motor: reverse |

In step 940, the gimbal device 700 may operate based on the detection values (for example, amount of pivotal movement) of the angular velocity sensor assigned to axes and the setting information of the motors. According to various embodiments of the present disclosure, the gimbal device 700 may detect an amount of pivotal movement of the holder 711 and another electronic device mounted in the holder 711, detected by the first angular velocity sensor 712, and may operate to control the plurality of motors 713a, 713b, 713c to compensate for the detected amount of pivotal movement.

Figure 10A:
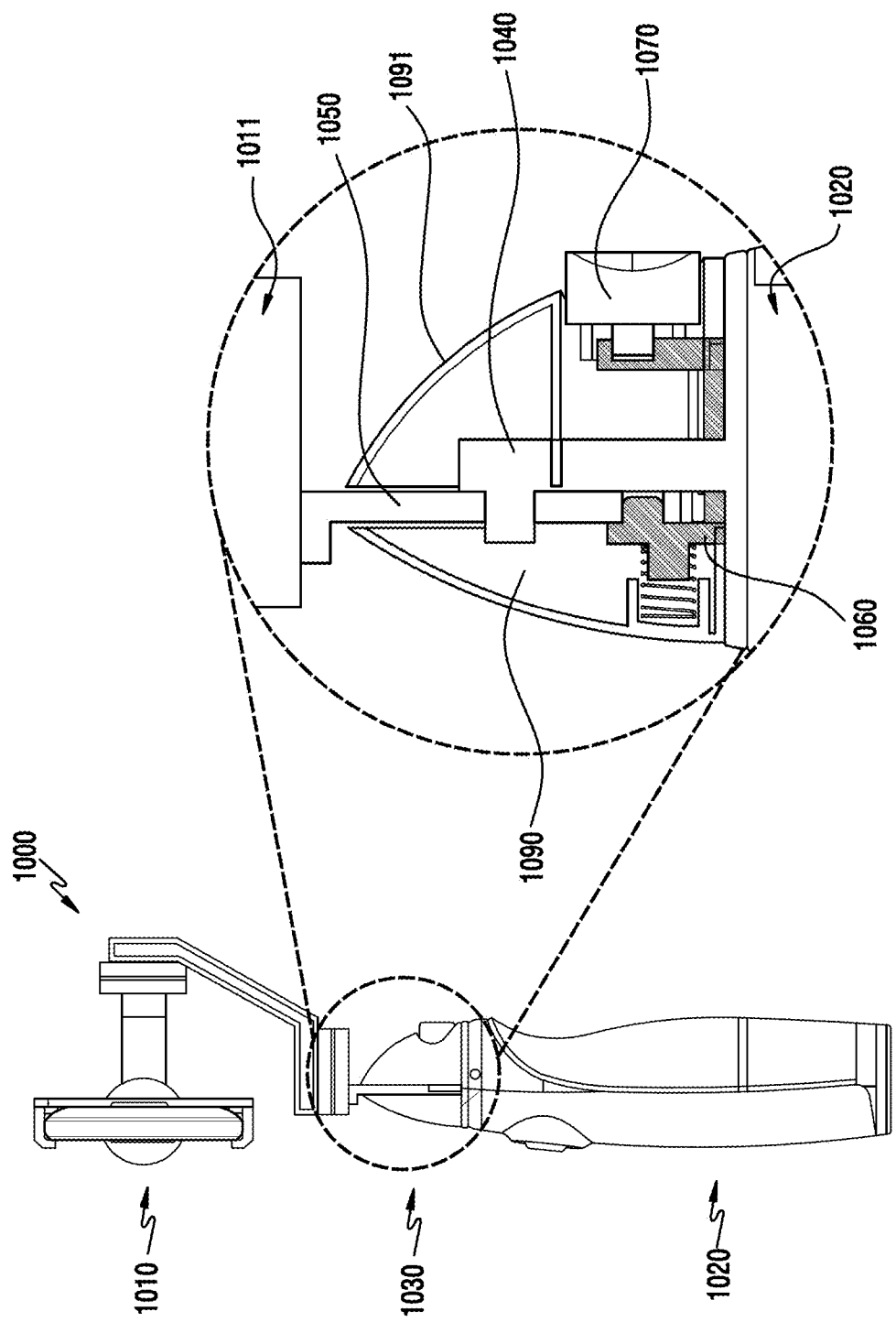
FIG. 10A is a side view and an enlarged view showing a gimbal device according to various embodiments of the present disclosure

FIG. 10A illustrates a side view and an enlarged view of a gimbal device according to various embodiments of the present disclosure.

Referring to FIG. 10A, the gimbal device 1000 according to various embodiments of the present disclosure may include a gimbal 1010, a handle 1020, and a joint 1030 pivotably coupling the gimbal 1010 and the handle 1020 to each other. Referring to the enlarged view of FIG. 10A, according to various embodiments, the joint 1030 may include a front surface housing 1090 (or a spring fixing portion) and a rear surface housing 1091 responsible for an exterior. The joint 1030 may include a joint structure and a lock structure disposed in an inner space of the front surface and rear surface housings 1090, 1091. The joint structure may allow the handle 1020 and the gimbal 1010 to pivot with respect to each other, and the lock structure may fix a pivoting state.

Figure 10B:
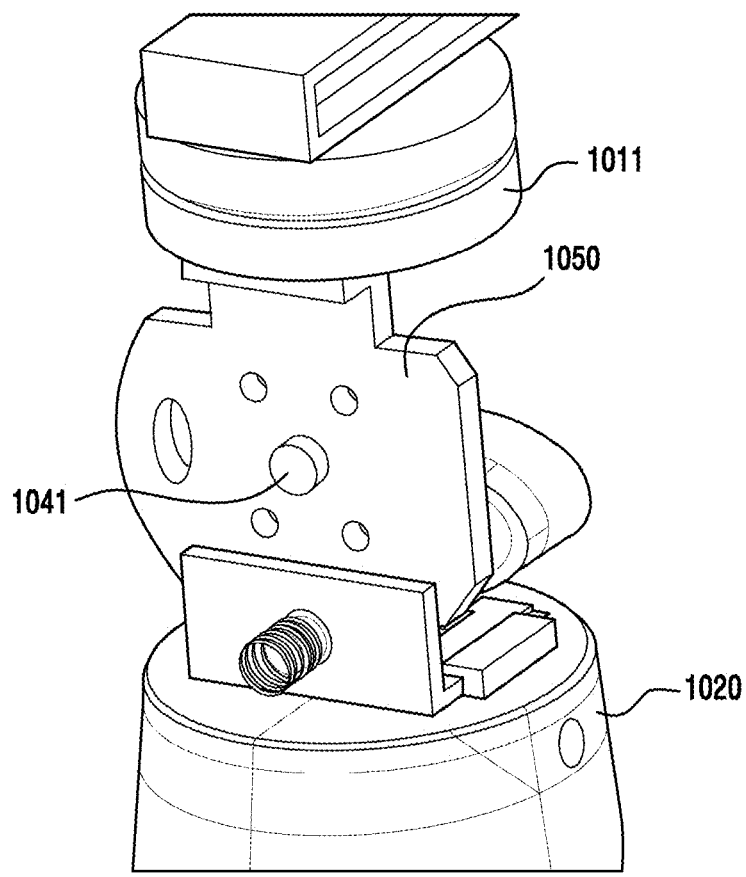
FIG. 10B is a perspective view showing an assembly state of a handle according to various embodiments of the present disclosure.
Figure 10C:
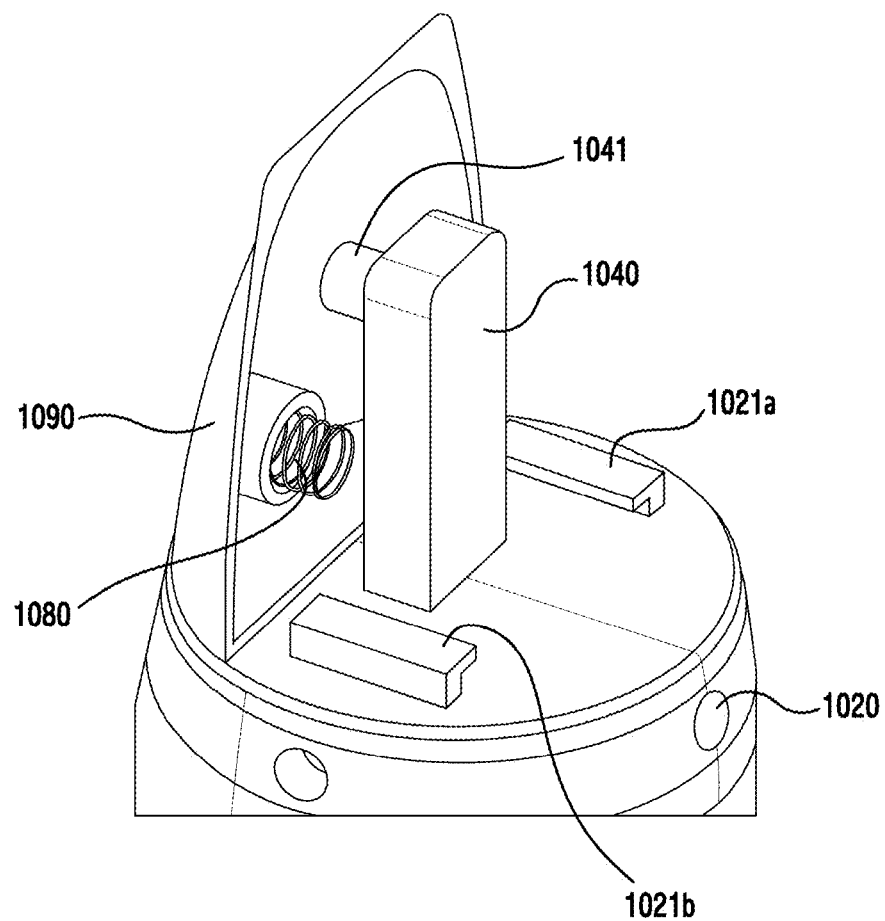
FIG. 10C is a perspective view showing a portion of the assembly state of the handle according to various embodiments of the present disclosure.

FIGS. 10B and 10C are perspective views showing an assembly state of the handle according to various embodiments of the present disclosure. Referring to FIGS. 10B and 10C, the joint structure of the joint 1030 according to various embodiments will be described. The joint 1030 may include a column 1040 and a hinge frame 1050. For example, a protrusion 1041 may protrude from the handle 1020. Alternatively, the column 1040 may be separately formed and may be attached to one end of the handle 1020. The column 1040 may include a pivoting protrusion 1041 formed at one end thereof. The hinge frame 1050 may be fixedly coupled to one end of the gimbal 1010, for example, a third motor 1011.

The column 1040 fixedly coupled to the handle 1020 and the hinge frame 1050 fixedly coupled to the third motor 1011 of the gimbal 1010 may be pivotably coupled to each other. For example, the column 1040 may be pivotably coupled to the hinge frame 1050 by inserting the pivoting protrusion 1041 into a hinge hole 1052 formed in the center of the hinge frame 1050. That is, the gimbal device 1000 may allow the gimbal 1010 and the handle 1020 fixed to the hinge frame 1050 and the column 1040 pivoting on the pivoting protrusion 1041, respectively, to pivot with respect to each other.

Figure 10D:
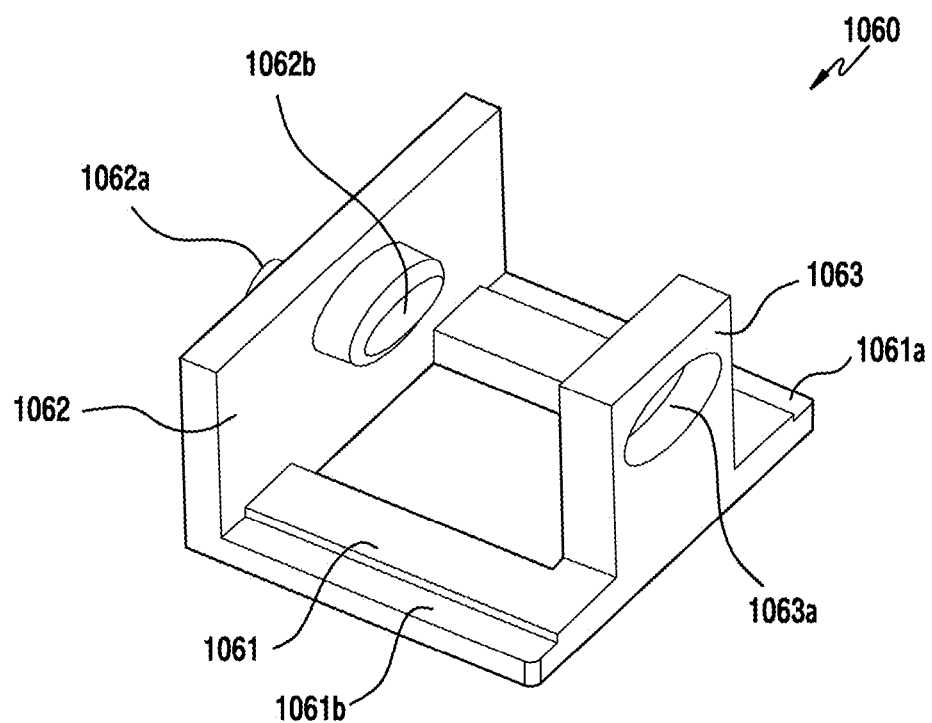
FIG. 10D is a perspective view showing a lever of the handle according to various embodiments of the present disclosure.
Figure 10E:
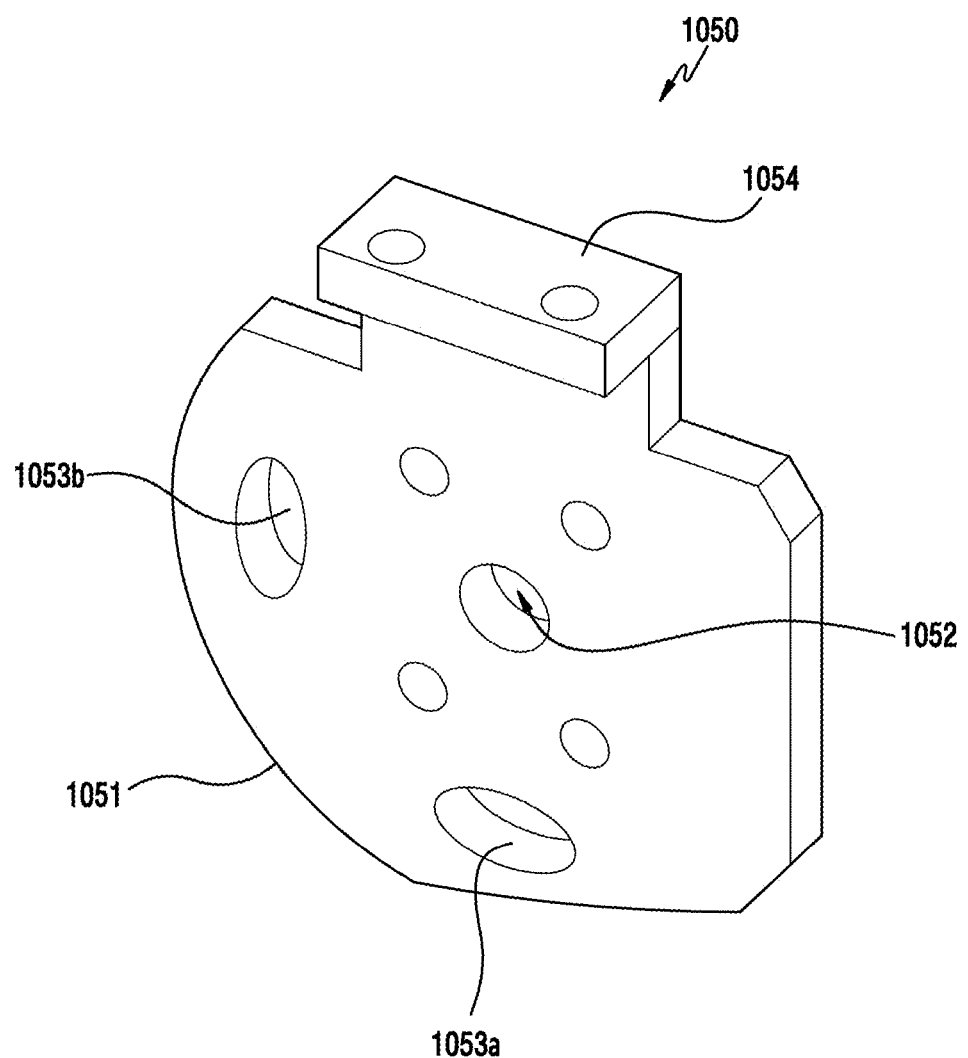
FIG. 10E is a perspective view showing an example of a hinge frame of the handle according to various embodiments of the present disclosure.

Referring to FIGS. 10C to 10E, the lock structure of the joint 1030 according to various embodiments will be described. Referring to FIG. 10C, the handle 1020 may include guide rails 1021a, 1021b. According to various embodiments, the handle 1020 may include a first guide rail 1021a and a second guide rail 1021b formed at both sides with reference to the column 1040. The guide rails 1021a, 1021b may have a hook shape protruding inward. Referring to FIG. 10D, the joint 1030 may include a lever 1060 which is guided by the guide rails 1021a, 1021b and is slidable in a predetermined direction. According to various embodiments, the lever 1060 may include a first stepped portion and a second stepped portion formed on both sides of a base 1061 to be guided by the guide rails 1021a, 1021b. The lever 1060 may include a first end 1062 protruding upward from the other both side surfaces to be perpendicular to the guide rails 1061a, 1061b, and a second end 1063 opposite the first end 1062. The first end 1062 may include a spring coupling portion 1062a and a lever protrusion 1062b protruding from both sides thereof. The spring coupling portion 1062a may receive the other end of a spring 1080 having one end coupled to the front surface housing 1090. The spring 1080 may apply an elastic force in a direction in which the lever 1060 slides. The second end 1063 may include a button coupling hole 1063a. A button 1070 may be fixedly coupled to the lever 1060 by the button coupling hole 1063a receiving a protrusion of the button 1070.

FIG. 10E is a perspective view showing an example of the hinge frame of the handle according to various embodiments of the present disclosure. The hinge frame 1050 according to various embodiments of the present disclosure may include a hinge hole 1052 formed on the center thereof to serve as a pivot axis of the joint 1030. One end 1054 of the hinge frame may be connected with the gimbal 1010. For example, one end 1054 of the hinge frame 1050 may be fixedly coupled to the third motor 1011 of the gimbal 1010. The hinge frame 1050 may include a circular shape with reference to the hinge hole 1052. The hinge frame 1050 may include a first lever hole 1053a formed opposite one end 1054 coupled to the gimbal 1010. In addition, the hinge frame 1050 may include a second lever hole 1053b formed at a position rotated by 90 degrees from the position of the first lever hole 1053a with reference to the hinge hole 1052. The lever protrusion 1062b of the lever 1060 may be inserted into the first lever hole 1053a and the second lever hole 1053b. The first and second lever holes 1053a, 1053b and the lever protrusion 1062b may maintain a pivoting state between the gimbal 1010 and the handle 1020 by an inserting or drawing out operation between them.

Figure 11:
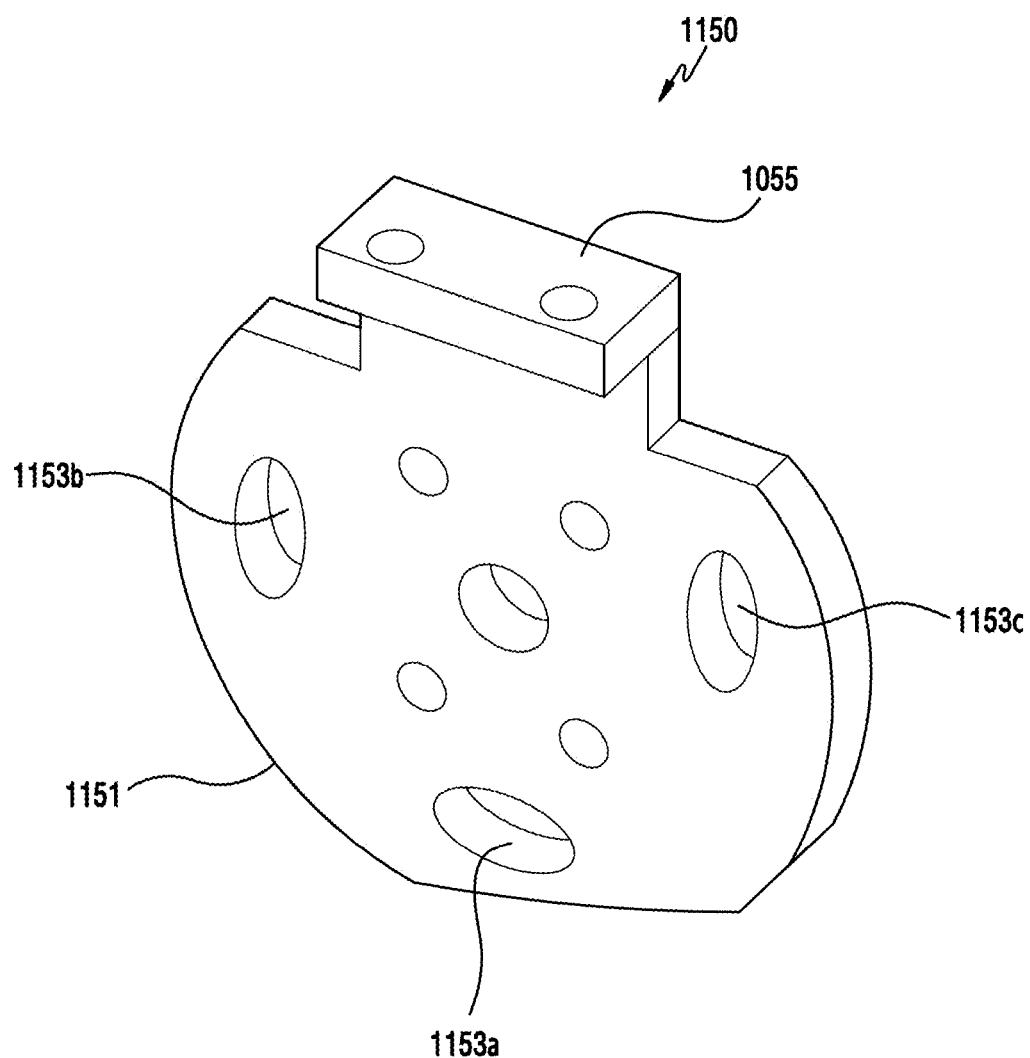
FIG. 11 is a perspective view showing another example of the hinge frame of the handle according to various embodiments of the present disclosure.

FIG. 11 is a perspective view showing another example of the hinge frame of the handle according to various embodiments of the present disclosure. The hinge frame of FIG. 11 may be a similar or same device to or as the hinge frame 1050 of FIG. 10E.

Referring to FIG. 11, the hinge frame 1150 according to various embodiments of the present disclosure may further include a third lever hole 1153c. The third lever hole 1153c may be disposed at a position rotated by 90 degrees from the first lever hole 1153a with reference to the hinge hole. Alternatively, the third lever hole 1153c may be disposed opposite the second lever hole 1153b with reference to the hinge hole. The gimbal device including the hinge frame 1150 having the three hinge holes may provide, for example, using example of the horizontal mode, the first vertical mode, and the second vertical mode.

FIGS. 12A to 12D are views showing an operation of a joint of a gimbal device according to various embodiments of the present disclosure.

Figure 12A:
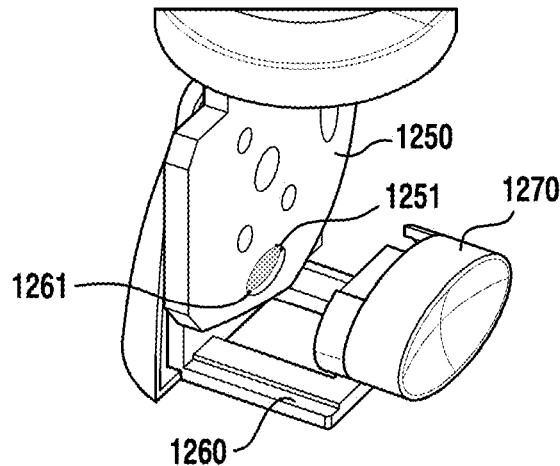
FIGS. 12A to 12D are views showing an operation flowchart of a joint of a gimbal device according to various embodiments of the present disclosure.

FIG. 12A illustrates a state in which a lever protrusion 1261 is inserted into a first lever hole 1251 of a hinge frame 1250. In this case, the gimbal device may provide a using example of a state in which the gimbal and the handle form a straight line, or the horizontal mode.

Figure 12B:
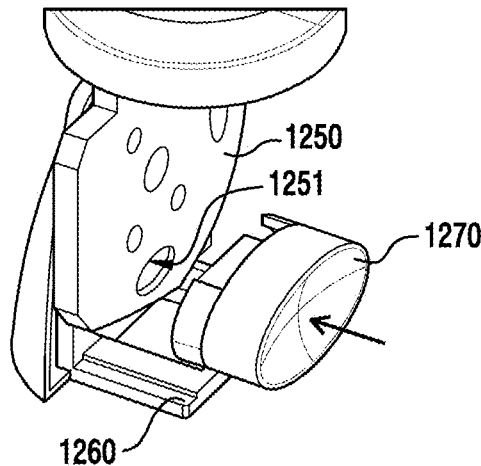

Referring to FIG. 12B, when the user presses a button 1270, a lever 1060 physically coupled to the button 1270 may slide and the lever protrusion 1621 may be drawn out from the first lever hole 1251.

Figure 12C:
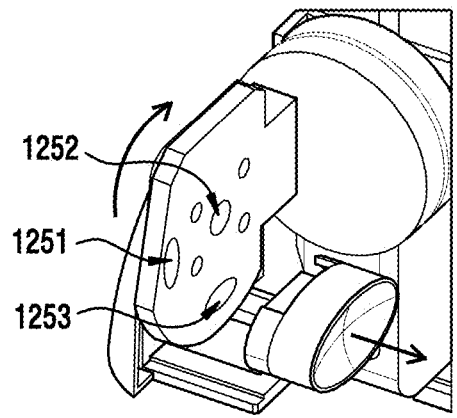

Referring to FIG. 12C, the hinge frame 1250 coupled to the gimbal may pivot on a hinge axis 1252 with the button 1270 being pressed. For example, the hinge frame 1250 may pivot by 90 degrees in the clockwise direction. Accordingly, a second lever hole 1253 disposed at a position rotated by 90 degrees with reference to the hinge axis 1252 may be placed at a position corresponding to the lever protrusion 1261, instead of the existing first lever hole 1251.

Figure 12D:
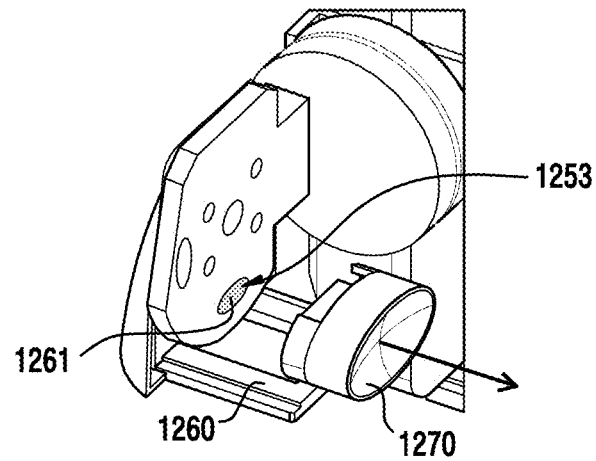

Referring to FIG. 12D, when the button 1270 is released, the lever 1260 and the button 1270 may slide in the opposite direction by the elastic force of a spring (not shown). Accordingly, the lever protrusion 1261 may be inserted into the second lever hole 1253. That is, the pivotal movement of the hinge frame 1250 may be confined by the lever protrusion 1261, such that the pivoting state of the joint can be fixed.

A gimbal device according to various embodiments of the present disclosure may include: a handle; a gimbal; wherein the gimbal includes: a holder configured to hold an electronic device including a camera; an angular velocity sensor disposed in the holder and configured to detect a movement of the holder; and a plurality of motors coupled to the holder and configured to pivot the holder in pitch, roll, and yaw directions according to the detected movement; a joint pivotably coupling one end of the gimbal to the handle.

The gimbal device according to various embodiments of the present disclosure may further include at least one processor, and the at least one processor may be configured to identify a pivoting state of the joint, and to change axis information assigned to each of detection values of three axes obtained by using the angular velocity sensor, based on the identified pivoting state.

The at least one processor of the gimbal device according to various embodiments of the present disclosure may be configured to change setting information of each of the plurality of motors based on the changed axis information.

The gimbal device according to various embodiments of the present disclosure may further include at least one sensor disposed in the joint to detect a pivoting angle of the joint, and the at least one processor may be configured to identify the pivoting state of the joint by using the pivoting angle of the joint detected by using the at least one sensor.

The at least one processor of the gimbal device according to various embodiments of the present disclosure may be configured to: when the identified pivoting state is a first state in which an opposite direction of a second direction of the angular velocity sensor is the direction of gravity, assign a detection value of a first direction obtained by using the angular velocity sensor to a pitch axis, assign a detection value of the second direction to a yaw axis, and assign a detection value of a third direction to a roll axis; and, when the identified pivoting state is a second state in which an opposite direction of the first direction of the angular velocity sensor is the direction of gravity, assign a detection value of the opposite direction of the first direction to the yaw axis, assign a detection value of the second direction to the pitch axis, and assign a detection value of the third direction to the roll axis.

The at least one process of the gimbal device according to various embodiments of the present disclosure may be configured to, when the identified pivoting state is a third state in which the first direction of the angular velocity sensor is the direction of gravity, assign a detection value of the first direction obtained by using the angular velocity sensor to the yaw axis, assign a detection value of the opposite direction of the second direction to the pitch axis, and assign a detection value of the third direction to the roll axis.

The at least one processor of the gimbal device according to various embodiments of the present disclosure may be configured to: when the identified pivoting state is the first state, control a first motor to be designated to pivot on the pitch axis in a forward direction, a second motor to be designated to pivot on the roll axis in the forward direction, and a third motor to be designated to pivot on the yaw axis in the forward direction; and, when the identified pivoting state is the second state, control the first motor to be designated to pivot on the yaw axis in a reverse direction, the second motor to be designated to pivot on the roll axis in the forward direction, and the third motor to be designated to pivot on the yaw-axis in the forward direction.

The at least one processor of the gimbal device according to various embodiments of the present disclosure may be configured to, when the identified pivoting state is the third state, control the first motor to be designated to pivot on the yaw axis in the forward direction, the second motor to be designated to pivot on the roll axis in the forward direction, and the third motor to be designated to pivot on the pitch axis in the forward direction.

The gimbal device according to various embodiments of the present disclosure may further include a second angular velocity sensor disposed in the handle.

The gimbal device according to various embodiments of the present disclosure may further include at least one processor, and the processor may be configured to detect an angle of the handle by using the second angular velocity sensor, and to change the axis information assigned to each of detection values of three axes obtained by using the angular velocity sensor, based on the detected angle of the handle.

The at least one processor of the gimbal device according to various embodiments of the present disclosure may be configured to identify a pivoting state of the joint, and to change the axis information assigned to each of the detection values of the three axes obtained by using the angular velocity sensor, based on at least one of the identified pivoting state and the detected angle of the handle.

The at least one processor of the gimbal device according to various embodiments of the present disclosure may be configured to change setting information of each of the plurality of motors based on the changed axis information.

The joint of the gimbal device according to various embodiments of the present disclosure may be disposed between a lower portion of the third motor pivoting on the yaw axis in the first state and one end of the handle.

The handle of the gimbal device according to various embodiments of the present disclosure may further include an inputting means, and the angle of the handle and the pivoting state of the joint may be identified based on a manual input of a user to the inputting means.

The joint of the gimbal device according to various embodiments of the present disclosure may further include a lock structure for fixing to maintain the pivoting state in the first state or the second state.

A gimbal device according to various embodiments of the present disclosure may include: a handle; a gimbal; and a joint pivotably coupling one end of the gimbal and the handle, wherein the joint may include a lock structure for fixing to maintain an inclined angle between the gimbal and the handle at a predetermined angle.

The joint of the gimbal device according to various embodiments of the present disclosure may include: a hinge frame fixedly coupled to one end of the gimbal; and a column extending from an upper surface of the handle toward the gimbal, and a pivoting protrusion formed on the column may be inserted into a hinge hole formed on a center region of the hinge frame, and the handle may be pivotably coupled to the gimbal.

The hinge frame of the gimbal device according to various embodiments of the present disclosure may further include at least two lever holes having a predetermined inclined angle with reference to the hinge hole, and the joint may further include a lever including a lever protrusion configured to be inserted into or drawn out from any one of the at least two lever holes, and, when the lever protrusion is inserted into any one of the at least two lever holes, a pivotal movement of the hinge frame with respect to the column may be confined (or the hinge frame may not pivot), and, when the lever protrusion is drawn out, the hinge frame may pivot with respect to the column.

The lever of the gimbal device according to various embodiments of the present disclosure may be configured to be slidable on the upper surface of the handle in a direction in which the lever protrusion is inserted or drawn out.

The gimbal device according to various embodiments of the present disclosure may further include: an elastic means configured to apply an elastic force in a direction in which the lever protrusion is inserted into the lever hole; and a lock button coupled to the lever to control the lever to slide by physical pressure of the user.

When the user presses the lock button, the lock structure of the gimbal device according to various embodiments of the present disclosure may be configured to allow the lever protrusion to be drawn out from any one of the at least two lever holes, and to allow the gimbal coupled to the hinge frame to pivot with respect to the handle, and, when the user does not press the lock button, the lock structure may be configured to allow the lever protrusion to be inserted into any one of the at least two lever holes by the elastic means, and to allow the gimbal coupled to the hinge frame to confine a pivotal movement with respect to the handle.

A module or a programming module according to the present disclosure may include at least one of the above elements, or a portion of the above elements may be omitted, or additional other elements may be further included. Operations performed by a module, a programming module, or other elements according to the present disclosure may be executed sequentially, in parallel, repeatedly, or in a heuristic method. Also, a portion of operations may be executed in different sequences, omitted, or other operations may be added.

As described above, the gimbal device according to various embodiments of the present disclosure may include the joint to adjust a capturing direction of an electronic device provided with a camera. The electronic device provided with a camera according to various embodiments of the present disclosure can have its direction changed simply by rotating the joint without having to be re-mounted, such that using convenience can be provided to the user. In addition, the gimbal device according to various embodiments of the present disclosure can provide experiences of various capturing modes to the user, based on a pivoting state of the joint and a grip state of the handle. Effects that can be achieved by the present disclosure are not limited to the above-mentioned effects, and other effects not mentioned herein will be clearly understood by a person skilled in the art from the following descriptions.

Although the present disclosure has been described with various embodiments, various changes and modifications may be suggested to one skilled in the art. It is intended that the present disclosure encompass such changes and modifications as fall within the scope of the appended claims.

What is claimed is:

1. A gimbal device comprising:
   a handle;
   a gimbal comprising:
   a holder configured to hold an electronic device comprising a camera;
   an angular velocity sensor disposed in the holder and configured to detect a movement of the holder; and
   a plurality of motors coupled to the holder and configured to pivot the holder in pitch, roll, and yaw directions according to the detected movement;
   a joint pivotably coupling one end of the gimbal to the handle; and
   a processor configured to:
   identify a pivoting state of the joint, and
   change axis information assigned to each of detection values of three axes obtained by using the angular velocity sensor, based on the identified pivoting state,
   wherein the processor is further configured to:
   when the identified pivoting state is a first state in which an opposite direction of a second direction of the angular velocity sensor is a direction of gravity, assign a detection value of a first direction obtained by using the angular velocity sensor to a pitch axis, assign a detection value of the second direction to a yaw axis, and assign a detection value of a third direction to a roll axis, and
   when the identified pivoting state is a second state in which an opposite direction of the first direction of the angular velocity sensor is the direction of gravity, assign a detection value of the opposite direction of the first direction to the yaw axis, assign a detection value of the second direction to the pitch axis, and assign a detection value of the third direction to the roll axis.

2. The gimbal device of claim 1, wherein the processor is configured to change setting information of each of the plurality of motors based on the changed axis information.

3. The gimbal device of claim 1, further comprising a sensor disposed in the joint to detect a pivoting angle of the joint,
   wherein the processor is configured to identify the pivoting state of the joint by using the pivoting angle of the joint detected by using the sensor disposed in the joint.

4. The gimbal device of claim 1, wherein, when the identified pivoting state is a third state in which the first direction of the angular velocity sensor is the direction of gravity, the processor is configured to assign a detection value of the first direction obtained by using the angular velocity sensor to the yaw axis, assign a detection value of the opposite direction of the second direction to the pitch axis, and assign a detection value of the third direction to the roll axis.

5. The gimbal device of claim 4, wherein, when the identified pivoting state is the third state, the processor is configured to control a first motor to be designated to pivot on the yaw axis in a forward direction, a second motor to be designated to pivot on the roll axis in the forward direction, and a third motor to be designated to pivot on the pitch axis in the forward direction.

6. The gimbal device of claim 1, wherein the processor is configured to:
   when the identified pivoting state is the first state, control a first motor to be designated to pivot on the pitch axis in a forward direction, a second motor to be designated to pivot on the roll axis in the forward direction, and a third motor to be designated to pivot on the yaw axis in the forward direction; and
   when the identified pivoting state is the second state, control the first motor to be designated to pivot on the yaw axis in a reverse direction, the second motor to be designated to pivot on the roll axis in the forward direction, and the third motor to be designated to pivot on the yaw axis in the forward direction.

7. The gimbal device of claim 6, wherein the joint is disposed between a lower portion of the third motor pivoting on the yaw axis in the first state and one end of the handle.

8. The gimbal device of claim 1, further comprising a second angular velocity sensor disposed in the handle.

9. The gimbal device of claim 8, further comprising an additional processor configured to:
   detect an angle of the handle by using the second angular velocity sensor, and
   change the axis information assigned to each of detection values of three axes obtained by using the angular velocity sensor, based on the detected angle of the handle.

10. The gimbal device of claim 9, wherein the additional processor is configured to:
    identify a pivoting state of the joint, and
    change the axis information assigned to each of the detection values of the three axes obtained by using the angular velocity sensor, based on the identified pivoting state and the detected angle of the handle.

11. The gimbal device of claim 10, wherein the additional processor is configured to change setting information of each of the plurality of motors based on the changed axis information.

12. The gimbal device of claim 1, wherein the joint further comprises a lock structure configured to fix to maintain the pivoting state in the first state or the second state.

* * * * *